United States Patent
Pereira et al.

(10) Patent No.: US 9,434,566 B2
(45) Date of Patent: Sep. 6, 2016

(54) PACKAGING MACHINE WITH VARIABLE-WIDTH BELT SYSTEM

(71) Applicant: Knauf Insulation, Inc., Shelbyville, IN (US)

(72) Inventors: Jon W. Pereira, Shelbyville, IN (US); Anthony D. Bryant, LaGrange, GA (US); James D. Haaser, Lancaster, OH (US); Steven A. Zetts, Perrysburg, OH (US)

(73) Assignee: Knauf Insulation, Inc., Shelbyville, IN (US)

( * ) Notice: Subject to any disclaimer, the term of this patent is extended or adjusted under 35 U.S.C. 154(b) by 0 days.

(21) Appl. No.: 14/647,382

(22) PCT Filed: Nov. 26, 2013

(86) PCT No.: PCT/US2013/072023
§ 371 (c)(1),
(2) Date: May 26, 2015

(87) PCT Pub. No.: WO2014/085465
PCT Pub. Date: Jun. 5, 2014

(65) Prior Publication Data
US 2015/0307303 A1    Oct. 29, 2015

Related U.S. Application Data

(60) Provisional application No. 61/730,713, filed on Nov. 28, 2012.

(51) Int. Cl.
*B30B 5/06* (2006.01)
*A01F 15/07* (2006.01)
(Continued)

(52) U.S. Cl.
CPC .............. *B65H 18/22* (2013.01); *A01F 15/07* (2013.01); *A01F 15/18* (2013.01); *B30B 5/06* (2013.01);
(Continued)

(58) Field of Classification Search
CPC ................. A01F 2015/183; A01F 2015/0795; A01F 2015/078; A01F 2015/077; A01F 15/18; A01F 15/0883; A01F 15/0833; A01F 15/07; A01F 15/0715; B65B 63/04; B65B 63/024; B65B 63/02; B65B 27/12; B65B 35/24; B30B 9/3082; B65H 18/22; B65H 18/023; B65H 2301/314; B65H 2301/41429; B65H 2801/81; B65H 2301/41384; B65H 2301/4138; B65H 2701/177
USPC .......................... 100/76, 87, 88; 56/341, 344
See application file for complete search history.

(56) References Cited

U.S. PATENT DOCUMENTS 3,964,235 A * 6/1976 Miller ..................... B65B 27/12
226/110
4,114,530 A    9/1978 Miller
(Continued)

FOREIGN PATENT DOCUMENTS

WO        01/32541 A1    5/2001
WO    2014/085465 A1    6/2014

OTHER PUBLICATIONS

International Search Report and Written Opinion received for PCT Patent Application No. PCT/US2013/072023, mailed on Apr. 14, 2014, 9 pages.

*Primary Examiner* — Jimmy T Nguyen
(74) *Attorney, Agent, or Firm* — Knauf Insulation, Inc.; James K. Blodgett

(57) ABSTRACT

A packaging machine (10) includes a machine foundation (22) and a variable-width belt system (24). The variable-width belt system (24) is moved relative to the packaging machine and configured to establish a belt pocket (26). A product is admitted into the belt pocket and rolled onto itself to establish a rolled product (16) as the belt moves relative to the machine foundation (22).

30 Claims, 19 Drawing Sheets

(51) Int. Cl.
  *B65H 18/22* (2006.01)
  *A01F 15/18* (2006.01)
  *B30B 9/30* (2006.01)
  *B65B 27/12* (2006.01)
  *B65B 63/02* (2006.01)
  *B65H 18/02* (2006.01)
  *B65B 35/24* (2006.01)
  *B65B 63/04* (2006.01)

(52) U.S. Cl.
  CPC .............. *B30B 9/3082* (2013.01); *B65B 27/12* (2013.01); *B65B 35/24* (2013.01); *B65B 63/02* (2013.01); *B65B 63/024* (2013.01); *B65B 63/04* (2013.01); *B65H 18/023* (2013.01); *A01F 2015/183* (2013.01); *B65H 2301/314* (2013.01); *B65H 2301/4138* (2013.01); *B65H 2301/41384* (2013.01); *B65H 2301/41429* (2013.01); *B65H 2701/177* (2013.01); *B65H 2801/81* (2013.01)

(56) References Cited

U.S. PATENT DOCUMENTS

| | | | | |
|---|---|---|---|---|
| 5,080,009 | A * | 1/1992 | Fritz | A01F 15/07 100/88 |
| 5,224,329 | A * | 7/1993 | Viaud | A01F 15/07 100/88 |
| 5,228,280 | A * | 7/1993 | Ratzlaff | A01F 15/07 100/88 |
| 6,321,507 | B1 * | 11/2001 | Copeland | B65H 18/22 100/40 |
| 2005/0056163 | A1 * | 3/2005 | Skarzenski | B30B 9/3082 100/88 |

* cited by examiner

PACKAGING MACHINE WITH VARIABLE-WIDTH BELT SYSTEM

CROSS-REFERENCE TO RELATED APPLICATION

This application is a U.S. national counterpart application of International Application Serial No. PCT/US2013/072023, filed Nov. 26, 2013, under 35 U.S.C. 371, which claims priority under 35 U.S.C. §119(e) to U.S. Provisional Application Ser. No. 61/730,713, filed Nov. 28, 2012, the entire disclosures of which is are hereby incorporated herein by reference.

BACKGROUND

The present disclosure relates to a packaging machine, and particularly to a packaging machine for making a rolled product. More particularly, the present disclosure relates to a packaging machine that may be configured to accept various widths of product.

SUMMARY

This application discloses one or more of the features recited in the appended claims and/or the following features which, alone or in any combination, may comprise patentable subject matter.

In one aspect of the present disclosure, a packaging machine includes a machine foundation and a variable-width belt system. The variable-width belt system is coupled to the machine foundation to move relative to the machine foundation to form a belt pocket. The belt pocket is adapted to receive a product therein to roll the product to establish a rolled product. The variable-width belt system is arranged in one of a narrow-product configuration and a wide-product configuration. When the variable-width belt system is in the narrow-product configuration, the variable-width belt system has a narrow width. When the variable-width belt system is in the wide-product configuration, the variable-width belt system has a relatively greater wide width.

In some embodiments, the variable-width belt system may include a center belt, a first outer belt, and a second outer belt. The center belt may be coupled to the machine foundation to move about a center-belt path that is generally fixed relative to the machine foundation. The provision of a center belt in combination with a first outer belt, and a second outer belt, especially when the center-belt path is generally fixed relative to the machine foundation, provides significal stability to the overall roll-up system and facilitates accurate control of the belt pocket, notably when the belt pocket is being formed at the start of a roll-up procedure. The first outer belt may be coupled to the machine foundation to move about a first outer-belt path that is movable back and forth laterally relative to the center belt while overlapping a first portion of the center belt. The second outer-belt path is movable back and forth laterally relative to the center belt while overlapping a second portion of the center belt.

The first outer belt may move laterally toward the center belt and the second outer belt. The second outer belt may move laterally toward the center belt and the first outer belt without the first outer belt and overlapping the second outer belt to cause the narrow-product configuration of the variable-width belt system to be established.

The first outer belt may move laterally away from the center belt and the second outer belt. The second outer belt may move laterally away from the center belt and the first outer belt while both the first and second outer belts to cause the wide-product configuration of the variable-width belt system to be established.

The packaging machine may further include a conveyor system and a compression unit. The conveyor system may be coupled to the machine foundation in a fixed position relative to the machine foundation. The conveyor system may provide the product to the belt pocket. The pre-compression unit may be coupled to the machine foundation to define a pre-compression region between the conveyor system and the compression unit. Compression of the product may increase as the product travels through the pre-compression region to the belt pocket. The pre-compression unit may be coupled to the machine foundation in a fixed position relative to the conveyor system during rolling of the product to form the rolled product.

The pre-compression unit may include a ramp and a belt guide. The ramp may be arranged to lie at an acute angle measured between a downwardly facing surface of the ramp and an upwardly facing surface of the conveyor system. The belt guide may be coupled to the machine foundation unit to extend in a direction away from the belt pocket and the belt guide. The belt guide and the conveyor system may cooperate to define an exit of the pre-compression region.

The packaging machine may further include an eject unit. The eject unit may be coupled to the machine foundation to move between a closed position and an opened position. When the eject unit is in the closed position, the belt pocket may be established. When the eject unit is in the opened position, the belt pocket may be collapsed causing the rolled product to eject from the packaging machine.

The eject unit and the belt guide may cooperate to define a gap of the belt pocket through which product passes before the belt pocket begins to roll the product. An entry distance may be defined between the exit of the pre-compression region and the gap of the belt pocket. The entry distance may remain generally unchanged while the belt pocket rolls the product.

The packaging machine may further include a cam system. The cam system may be coupled to the machine foundation in a fixed position. The variable-width belt system may be routed through the cam system to cause the center-belt path, the first outer-belt path, and the second outer-belt path to be varied to cause the belt pocket to increase in size at a predetermined rate as product is fed into the belt pocket.

The cam system may include a pocket-adjustment unit and a belt-feed unit. The pocket-adjustment unit may be coupled to the machine foundation in a fixed position. The belt-feed unit may be coupled to the machine foundation to pivot up and down about a pivot axis relative to the machine foundation. The variable-width belt system may be routed between the pocket-adjustment unit and the belt-feed unit to cause the pocket size to increase as the belt-feed unit pivots in a clockwise direction about the pivot axis.

The cam system may further include a cam positioned to lie between the pocket-adjustment unit and the belt-feed unit. The belt-feed unit may pivot in response to rotation of the cam relative to the pocket-adjustment unit.

The cam system may further include sensors coupled to the pocket-adjustment unit. The sensors may be configured to sense tension in the variable-width belt system to cause a tightness profile to be developed in the rolled product. The sensors may be two load cells configured to sense tension in the center belt, the first outer belt, and the second outer belt. The tightness profile may be generally constant throughout or the tightness profile may decrease from a center of the rolled product to an outer surface of the rolled product. Where sensors, for example load sensors, are used to monitor belt tension, for example as described above, an indication of belt tension provided by the sensors may be used to monitor whether the machine is operating at a correct or expected belt tension. This may be used to indicate correct or incorrect machine operation and/or may be used in a feedback control system to control operation of the machine. An indication of belt tension may be used to control one or more aspects of the machine's operation, for example, amount and/or speed of belt payout. The tension(s) of a center belt and/or a first outer belt and/or a second outer belt may be monitored.

The packaging machine may further include a conveyor system, a pre-compression region arm, and a compression unit. The conveyor system may be coupled to the machine foundation in a fixed position relative to the machine foundation to provide the product to the belt pocket. The pre-compression region arm may be coupled to the machine foundation to pivot back and forth about an arm axis when the packaging machine is not rolling product. The pre-compression unit may be coupled to the pre-compression region arm to move therewith to vary a thickness of a pre-compression region defined between the pre-compression unit and the conveyor system.

The pre-compression region arm may rotate in a clockwise direction about the arm axis to increase a thickness of the pre-compression region. The pre-compression region arm may have a length that is configured to establish a generally linear movement of the pre-compression unit during movement of the pre-compression region arm.

The packaging machine may further include a belt-drive system. The belt-drive system may be coupled to the machine foundation in a fixed position relative to the machine foundation. The belt-drive system may be configured to provide means for driving the variable-width belt system to move relative to the machine foundation so that product admitted into the belt pocket is rolled to form the rolled product. The belt-drive system may also be configured to provide means for arranging the variable-width belt system between the narrow-product configuration and the wide-product configuration so that variable width products may be received in the belt pocket.

The belt-drive system may include a center belt-adjustment unit, a first outer-belt adjustment unit, and a second outer-belt adjustment unit. The center belt-adjustment unit may be configured to support and move the center belt relative to the machine foundation to cause the center-belt path to remain generally fixed relative to the machine foundation. The first outer-belt adjustment unit may be configured to support and move the first outer belt relative to the machine foundation to cause the first outer-belt path to move back and forth laterally relative to the machine foundation. The second outer-belt adjustment unit may be configured to support and move the second outer belt relative to the machine foundation to cause the second outer-belt path to move back and forth laterally relative to the machine foundation.

The packaging machine may further include an end-plate system. The end-plate system may be configured to provide means for blocking lateral movement of the product in the belt pocket during rolling of the product when the belt system is in one of the narrow-product configuration and the wide-product configuration so that telescoping of the product is minimized.

The end-plate system may include a support structure, a first end plate, and a second end plate. The first end plate may be coupled to the support structure to move laterally relative to the support structure to cause the first end plate to lie in spaced-apart relation to an outer edge of the first outer belt a first distance. The second end plate may be coupled to the support structure to move laterally relative to the support structure to cause the second end plate to lie in spaced-apart relation to an outer edge of the second outer belt the first distance. The first distance may be about 0.5 inches (about 1.3 cm).

The rolled product may have an un-rolled length of about 33 feet (about 10.1 m) with a recovered thickness of about 13 inches (about 33 cm). In another example, the rolled product may have an un-rolled length of about 225 feet (about 68.6 m) with a recovered thickness of about 4 inches (about 10.2 cm). The rolled product may have a compression ratio of about 6.8 to 9.0. The rolled product may have a density of about 6.5 lb/ft$^3$ to 7.0 lb/ft$^3$ (about 104.5 kg/m$^3$ to 112.1 kg/m$^3$).

The rolled product may have a first end arranged to lie at a center of the rolled product and an opposite second end arranged to lie at a circumference of the rolled product. The first end may have an unrolled thickness when the rolled product is unrolled to form an unrolled product. The second end may have the unrolled thickness when the rolled product is unrolled to form the unrolled product.

The packaging machine may further comprise means for paying out belt from the variable-width belt system to the belt pocket to increase a circumference of the belt pocket at a belt-payout rate while the product is admitted to the belt pocket at a product rate to cause a linear relationship to be established between the belt-payout rate and the product rate so that pressure developed in the rolled product is controlled during rolling of the product. The means for paying out belt may includes a pocket-adjustment unit, a belt-feed unit, and a cam. The pocket-adjustment unit may be coupled to the machine foundation in a fixed position during rolling of the product. The belt-feed unit may be coupled to the machine foundation to pivot up and down about a pivot axis relative to the machine foundation. The cam may be positioned to lie between the pocket-adjustment unit and the belt-feed unit to cause the belt-feed unit to pivot in a clockwise direction about the pivot axis to cause the belt pocket to increase in size as the cam rotates relative to the pocket-adjustment unit. In a preferred embodiment, belt payout is controlled using one or more servo motors; this allows the exact amount of belt payout desired to be accurately and easily controlled.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a packaging machine in accordance with the present disclosure showing that an uncompressed product is provided to the packaging machine by a vacuum-conveyor system where the uncompressed product is compressed by a pre-compression unit to form a pre-compressed product before being admitted into a belt pocket where a belt system included in the packaging machine rolls the pre-compressed product to form a rolled product;

FIG. 2 is an exploded assembly view of the packaging machine of FIG. 1 showing that the packaging machine includes, starting in the center of the page and working around the page in a clockwise direction beginning at a top-center of the page, a machine foundation, a belt-drive system, the belt system including a center belt, a first outer belt, and a second outer belt, a pre-compression region arm, an eject system, a receiving platform, an end-plate system, a compression unit, the vacuum-conveyor system, a side-guide system, a cam system, and a trim system;

Figure 1:
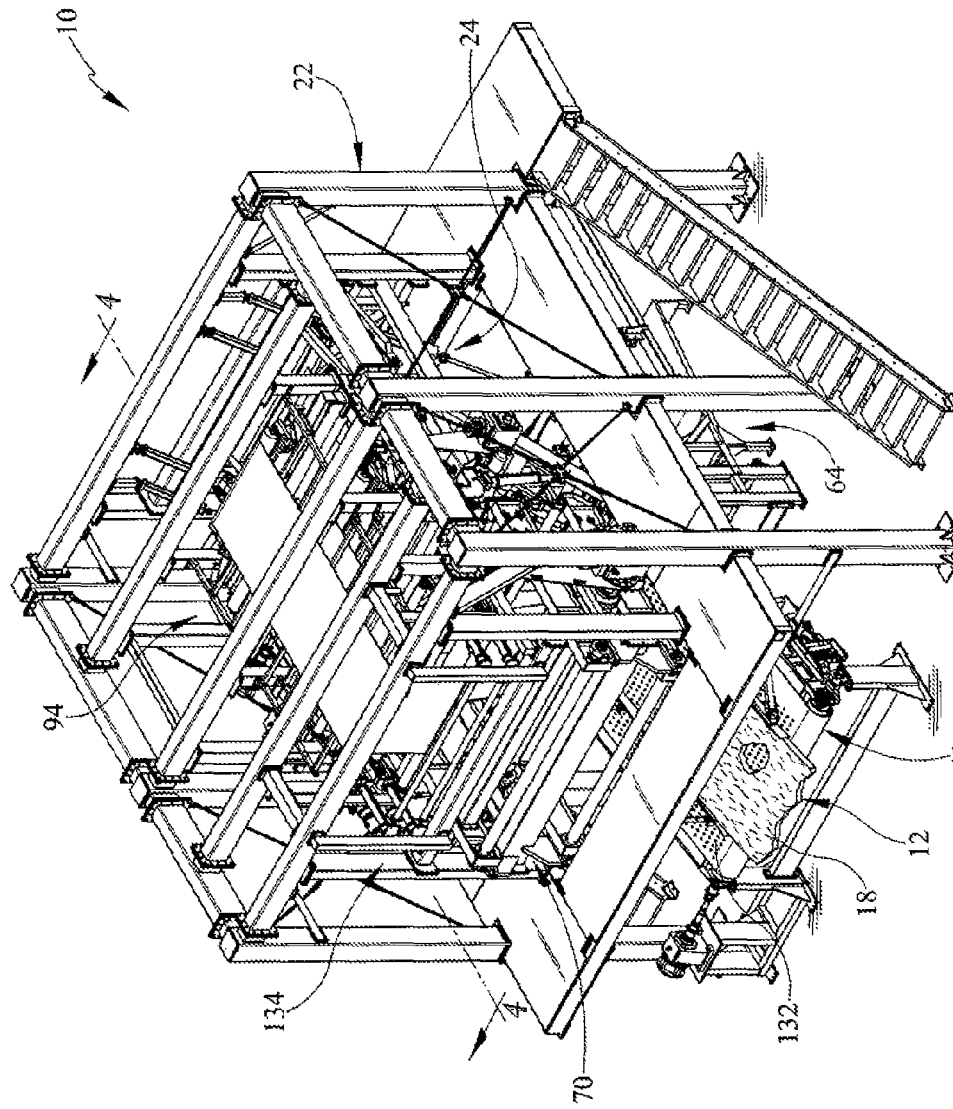
Figure 9:
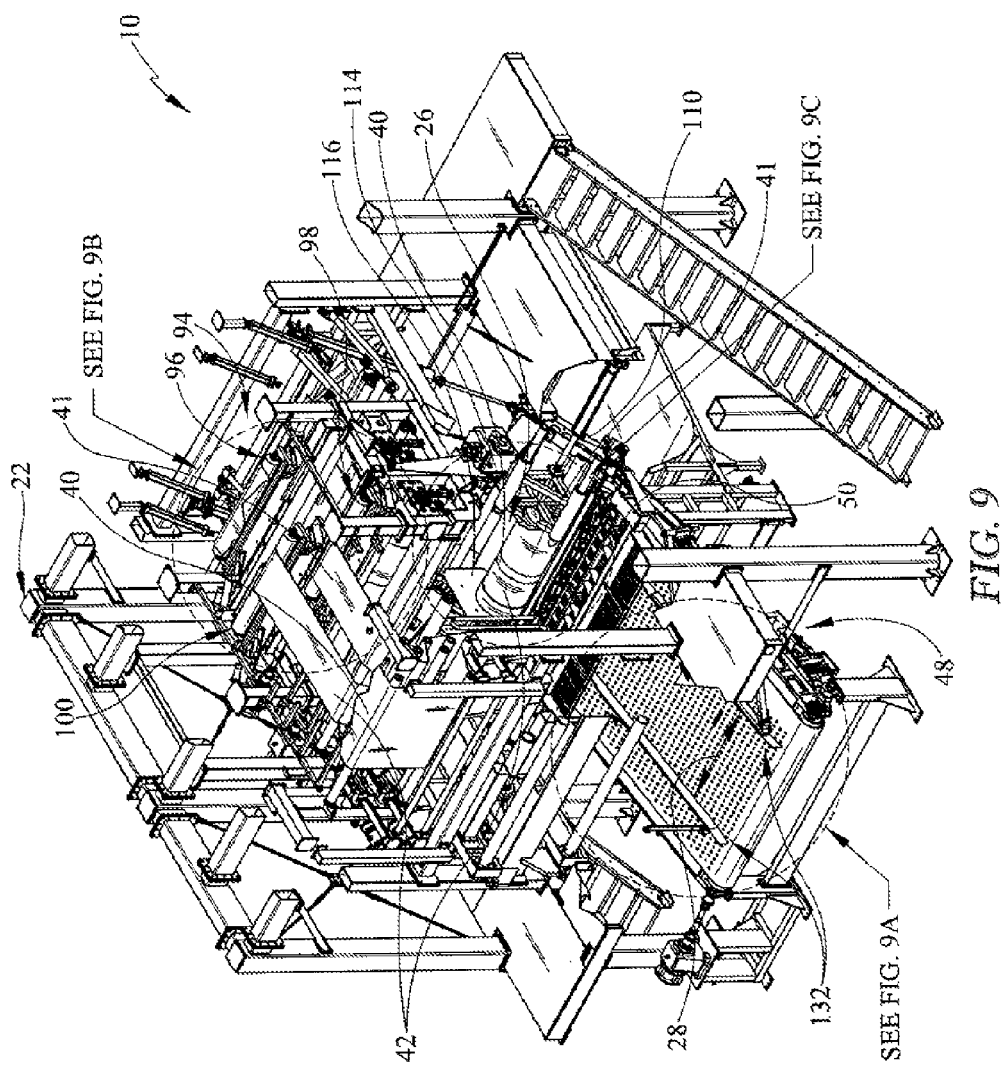
FIG. 9 is a perspective view of the packaging machine of FIG. 1 arranged in a narrow-product arrangement in which the side-guide assembly, the end-plate system, and the belt-drive system have moved inwardly to accommodate an uncompressed product having a minimum width.
Figure 9A:
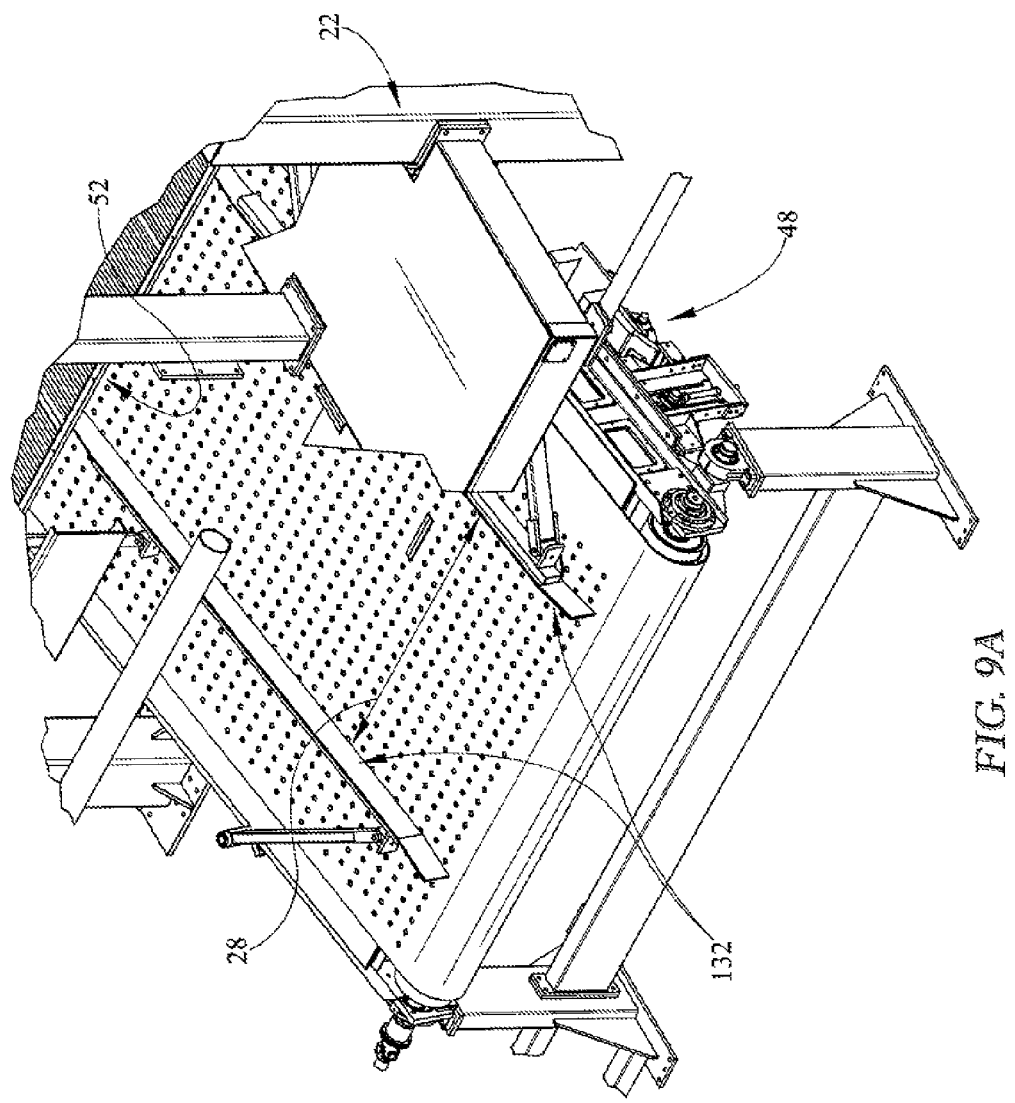
FIG. 9A is an enlarged partial perspective view of the side-guide assembly in the narrow-product arrangement.
Figure 9B:
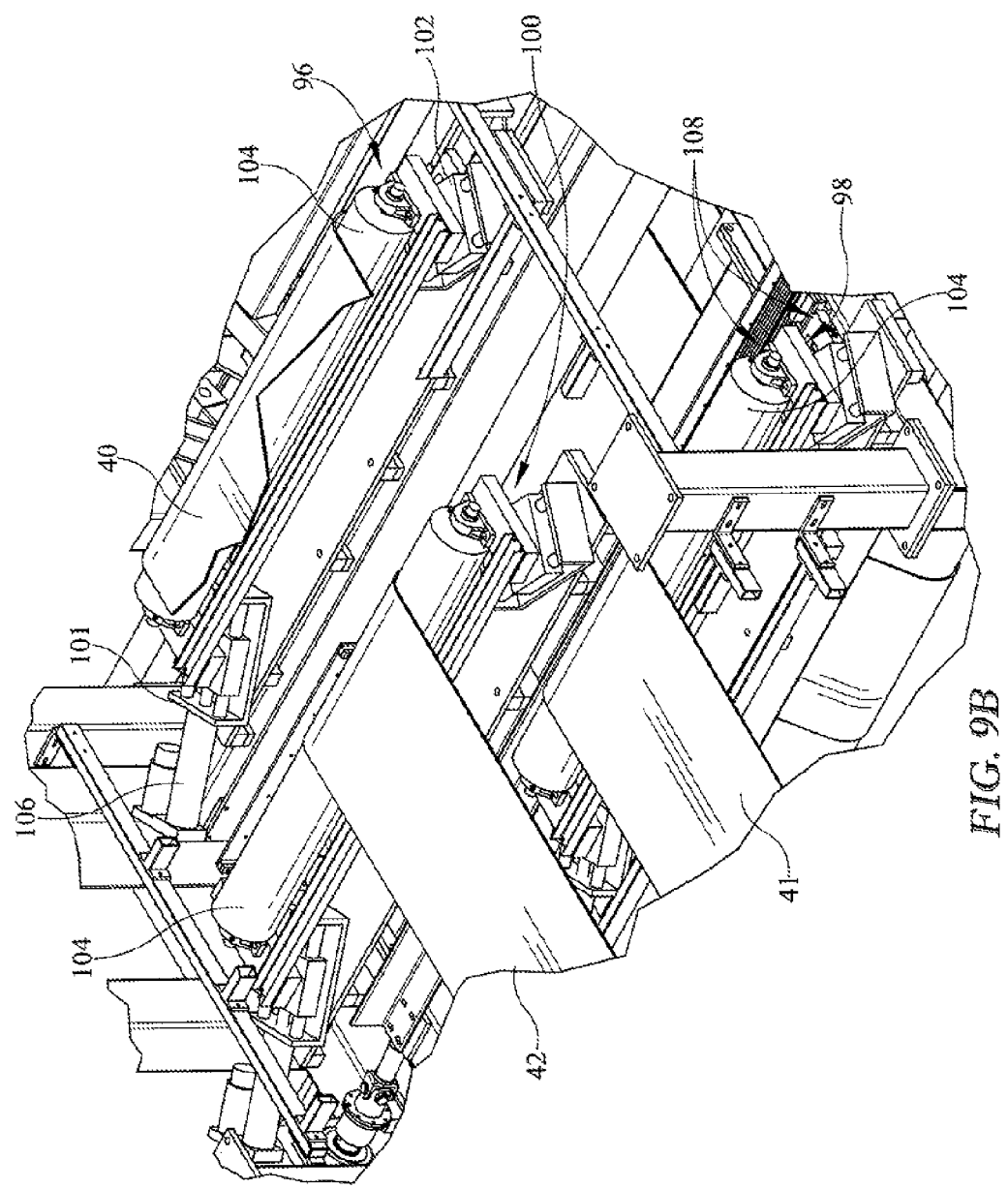
Figure 9C:
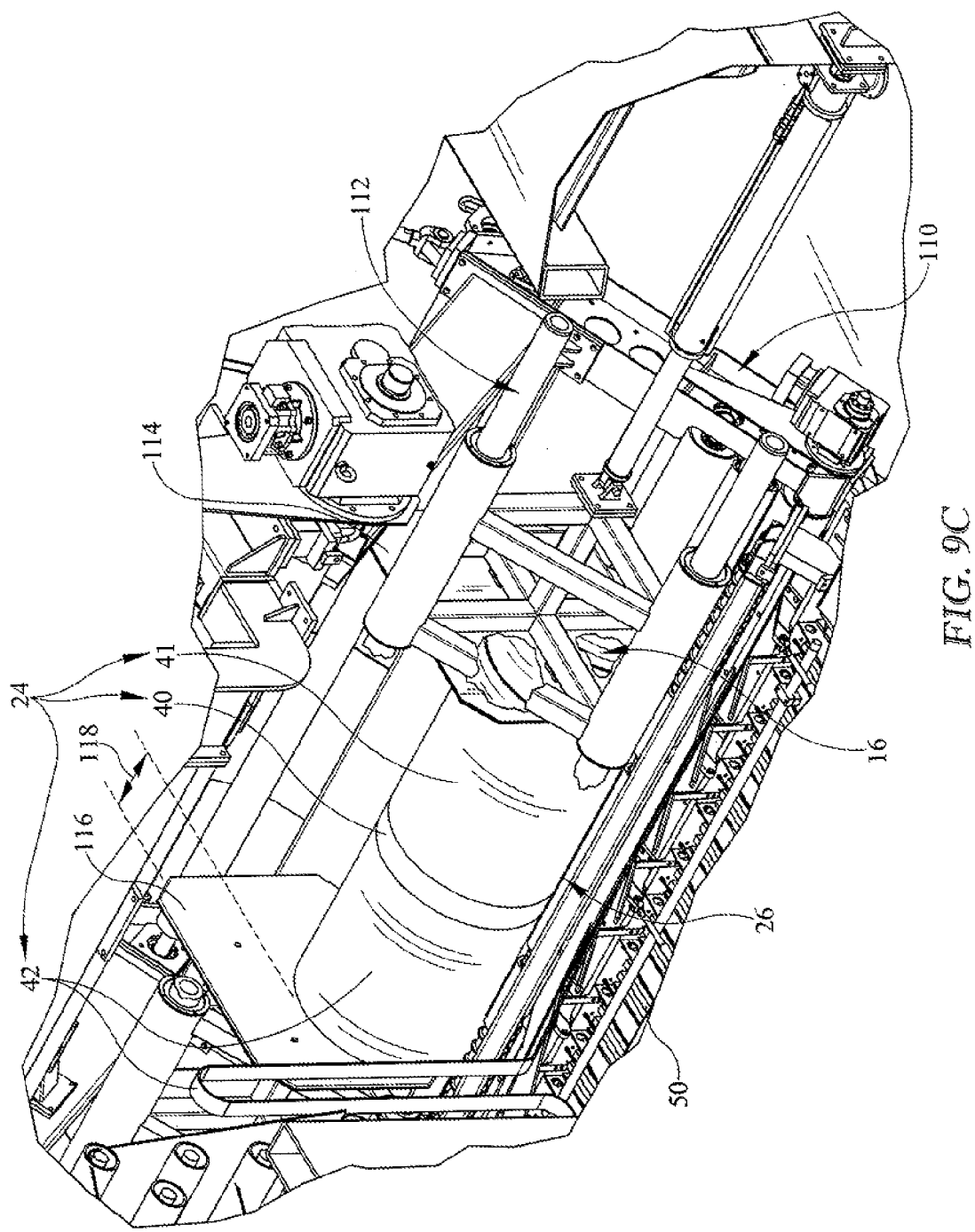
Figure 10:
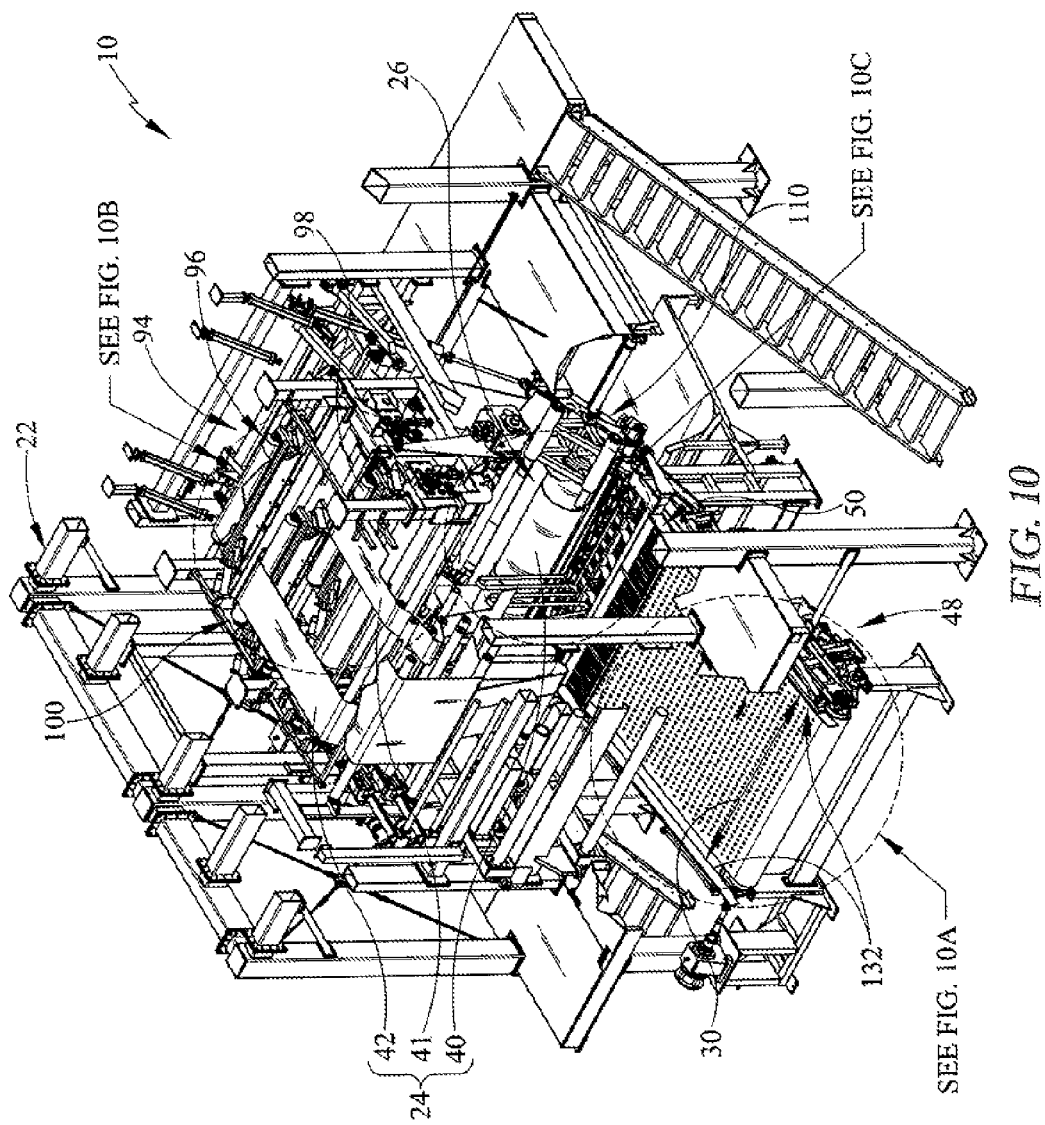
Figure 10A:
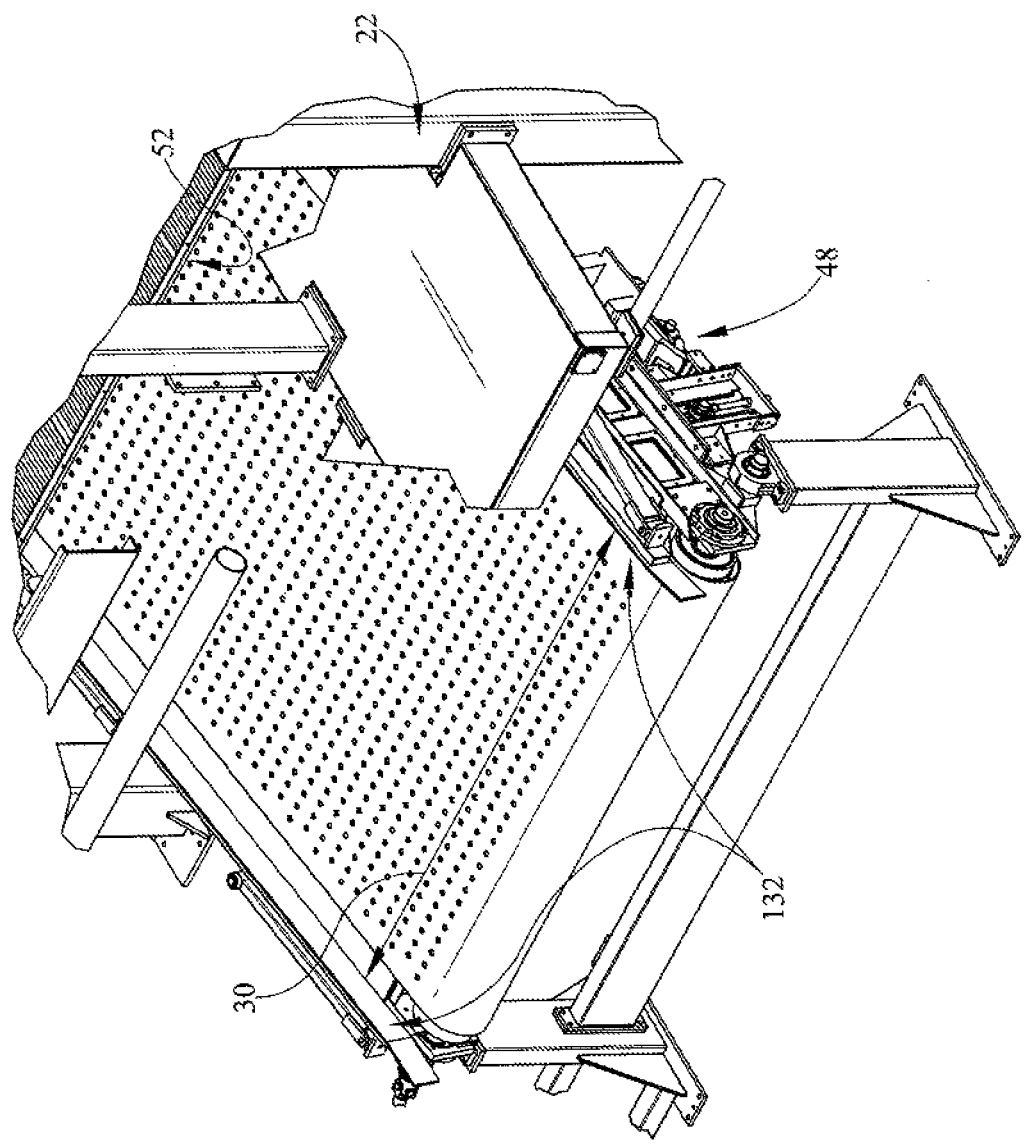
Figure 10B:
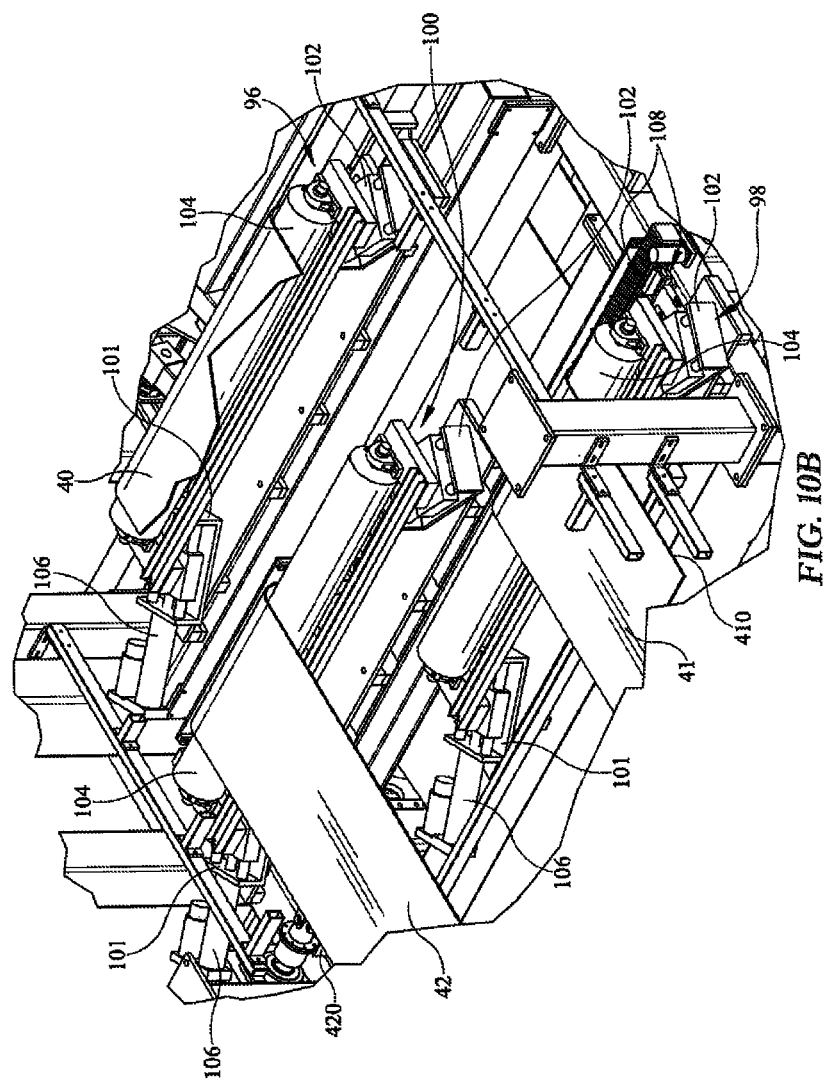
Figure 10C:
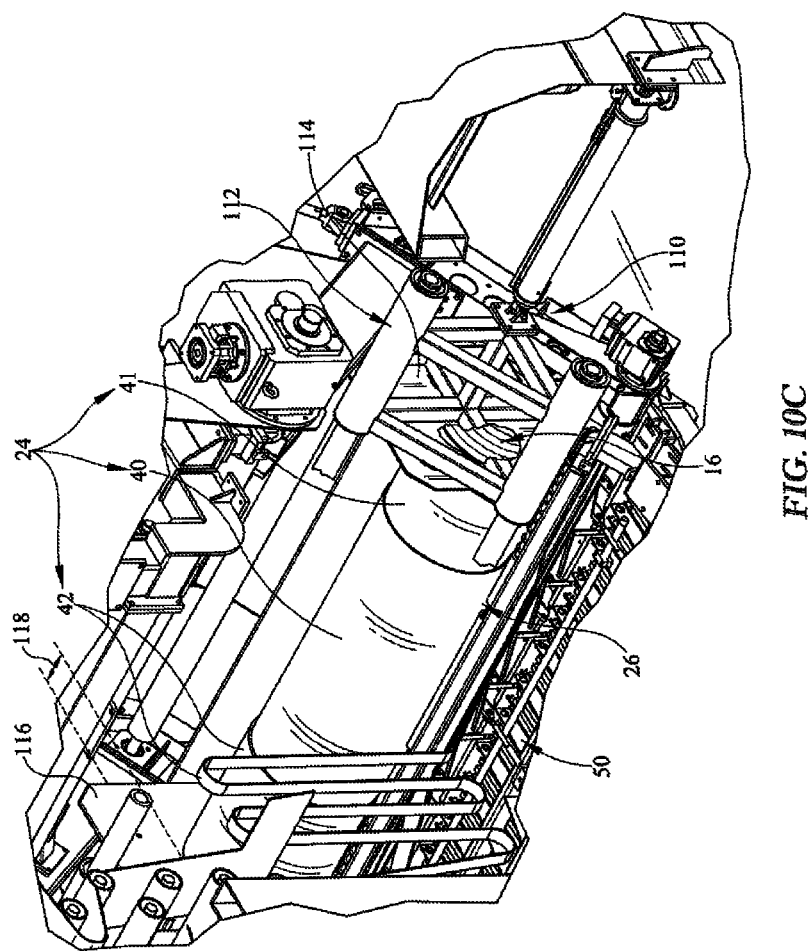
Figure 11:
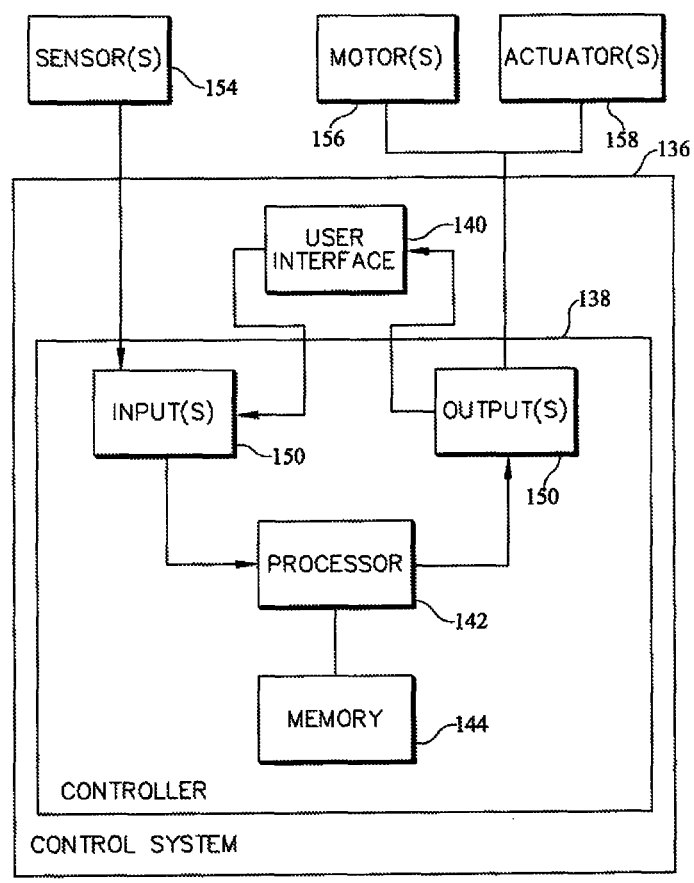
Figure 12A:
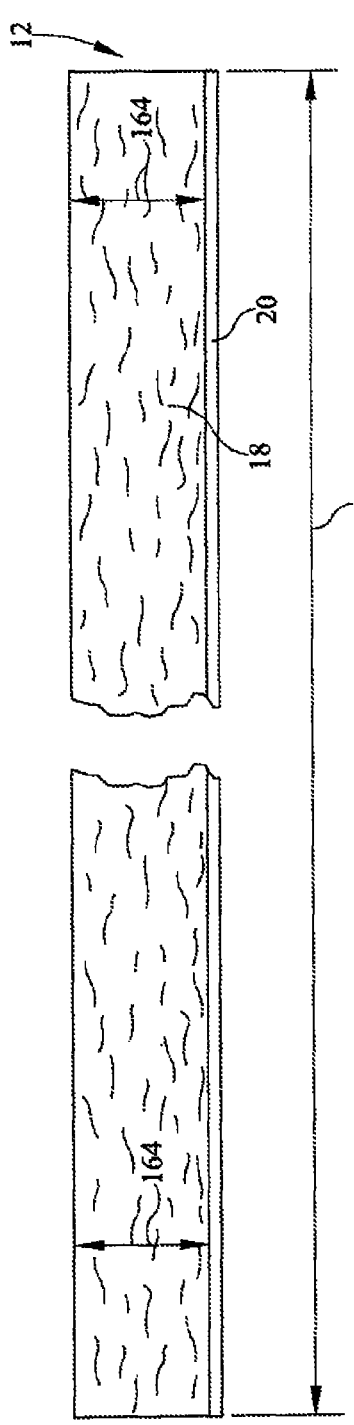
Figure 12B:
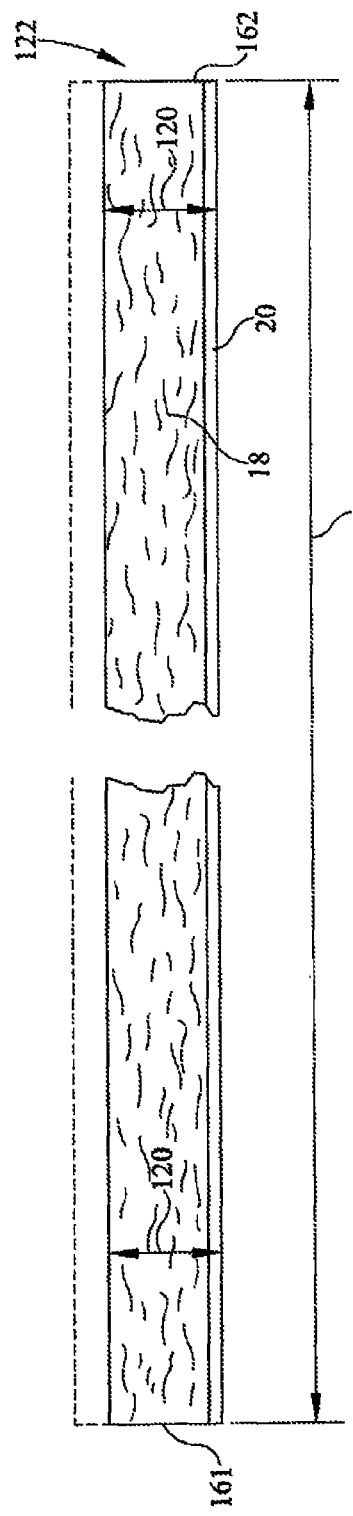

FIG. 9B is an enlarged partial perspective view of the belt-drive system in the narrow-product arrangement and showing that the belt-drive system includes a center belt-adjustment unit coupled to the center belt to support the center belt, a first outer-belt adjustment unit coupled to the first outer belt to support and move the first outer belt laterally, and a second outer-belt adjustment unit coupled to the second outer belt to support and move the second outer belt laterally;

FIG. 9C is an enlarged partial perspective view of the end-plate system in the narrow-product arrangement;

FIG. 10 is a view similar to FIG. 9 showing the packaging machine of FIG. 1 arranged in a wide-product arrangement in which the side-guide assembly, the end-plate system, and the belt-drive system have moved to accommodate an uncompressed product having a maximum width;

FIG. 10A is a view similar to FIG. 9A showing the side-guide assembly in the wide-product arrangement;

FIG. 10B is a view similar to FIG. 9B showing the belt-drive system in the wide-product arrangement;

FIG. 10C is a view similar to FIG. 9C showing the end-plate system in the wide-product arrangement;

FIG. 11 is a diagrammatic view of a control system included in the packaging machine of FIG. 1 showing that that the control system includes a controller including inputs, outputs, a processor, and memory and a user interface and suggesting that the inputs of the controller are coupled to sensors included in the packaging machine and the outputs of the controller are coupled to motors and actuators included in the packaging machine;

FIG. 12A is an elevation view of an uncompressed product showing that the uncompressed product includes a first end having an uncompressed thickness, an opposite second end having the uncompressed thickness, and an unrolled length; and FIG. 12B is an elevation view of an unrolled product showing that the unrolled product has generally uniform recovered thickness that is relatively smaller than the uncompressed thickness of the uncompressed product.

DETAILED DESCRIPTION

A packaging machine 10 in accordance with the present disclosure is shown in FIG. 1. Packaging machine 10 is configured to receive an uncompressed product 12, compress the uncompressed product 12 to establish a pre-compressed product 14, and roll the pre-compressed product 14 to establish a rolled product 16 as suggested in FIGS. 4-6. In one illustrative example, the uncompressed product 12 is an insulation batt that includes fiberglass insulation 18 coupled to a backing 20 as shown in FIG. 1. During compression of the uncompressed product 12, air is removed and density is increased to establish the pre-compressed product 14. During rolling, additional air is removed from the pre-compressed product 14 and the pre-compressed product is rolled onto itself forming the rolled product 16.

Figure 3:
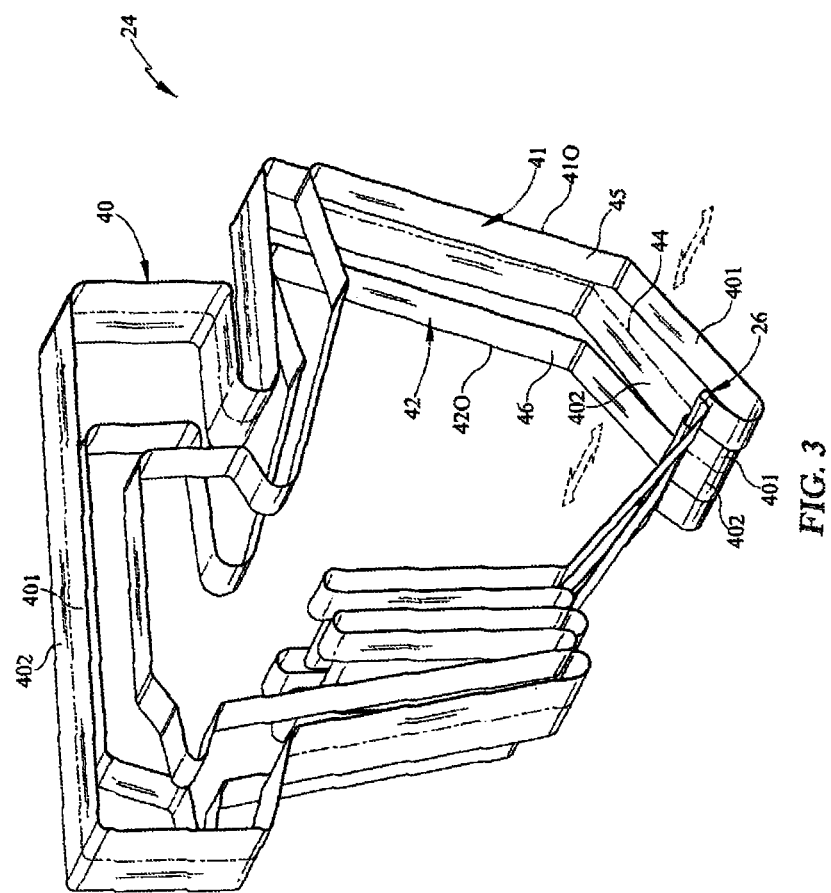
FIG. 3 is an exploded assembly view of the belt system of FIG. 1 showing that the belt system includes a first outer belt, a center belt, and a second outer belt and suggesting that the outer belts overlap the center belt and move laterally relative to the center belt to vary a width of product that may be rolled on the packaging machine.
Figure 4:
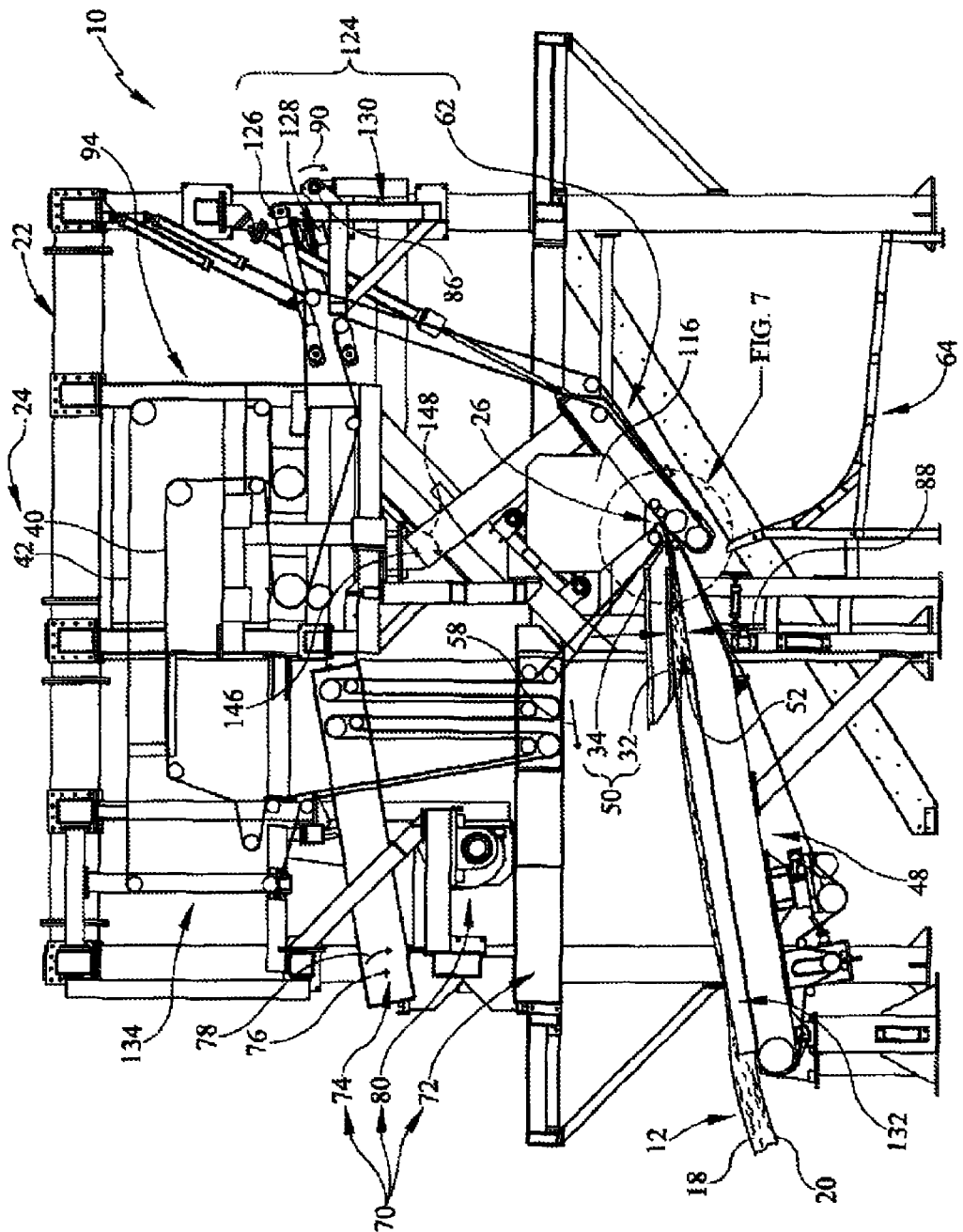
FIG. 4 is a sectional view taken along line 4-4 of FIG. 1 showing the packaging machine in an initial stage of product winding in which pre-compressed product has just started to be introduced into the belt pocket and the eject system is in the closed position.
Figure 5:
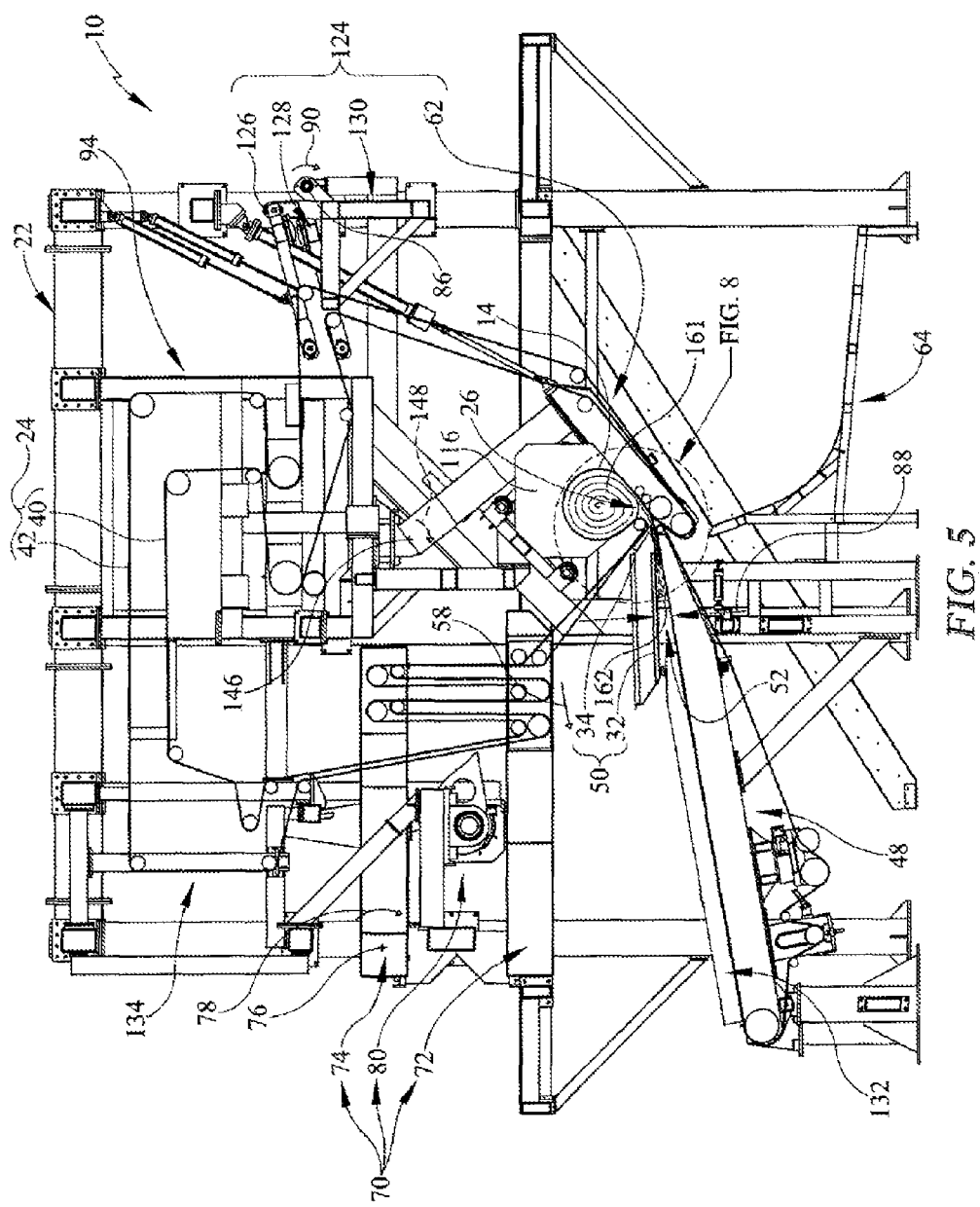
FIG. 5 is a view similar to FIG. 4 showing the packaging machine in a final stage of product winding in which pre-compressed product has about completed winding in the belt pocket and the eject system is in the closed position.

The packaging machine 10 includes a machine foundation 22 and a variable-width belt system 24 as shown in FIG. 1. The variable-width belt system 24 is coupled to the machine foundation 22 to move relative to the machine foundation to form a belt pocket 26 as shown in FIGS. 3-5. The belt pocket 26 is adapted to receive the uncompressed product 12 therein which is rolled as the variable-width belt system 24 moves relative to the machine foundation 22. As a result, the rolled product 16 is established.

The variable-width belt system 24 may be arranged in various configurations which include a narrow-product configuration as shown in FIGS. 9-9C and a wide-product configuration as shown in FIGS. 10-10C. The narrow-product configuration is associated with a narrow-width product that is fed into the packaging machine 10 and has a narrow width 28 as suggested in FIGS. 9-9C. The wide-product configuration is associated with a wide-width product that is fed into the packaging machine 10 and has a wide width 30 as suggested in FIGS. 10-10C. As an example, the narrow-width product may have a narrow-product width of about 56 inches (about 1.4 in). The wide-width product may have a wide-product width of about 106 inches (about 2.7 m).

The variable-width belt system 24 includes a center belt 40, a first outer belt 41, and a second outer belt 42 as suggested in FIG. 1 and shown in FIG. 3. The center belt 40 is coupled to the machine foundation 22 to move about a center-belt path 44 that is generally fixed relative to the machine foundation 22. The first outer belt 41 is coupled to the machine foundation 22 to move about a first outer-belt path 45 that is movable back and forth laterally relative to the center belt 40. The second outer belt 42 is coupled to the machine foundation 22 to move about a second outer-belt path 46 that is movable back and forth laterally relative to the center belt 40.

The center belt 40 includes first half 401 and a second half 402 as shown in FIG. 3. The first outer belt 41 overlaps a portion of the first half 401 of the center belt 40 as the first outer belt 41 moves back and forth laterally relative to the center belt 40. The second outer belt 42 overlaps a portion of the second half 402 of the center belt 40 as the second outer belt 42 moves back and forth laterally relative to the center belt 40. The first outer belt 41 and the second outer belt 42 lie in spaced-apart relation to one another whether the variable-width belt system 24 is in the wide-product configuration or the narrow-product configuration as shown in FIGS. 9-10C.

When the variable-width belt system 24 moves to the narrow-product configuration, the first outer belt 41 moves laterally toward the center belt 40 and the second outer belt 42. At the same time, the second outer belt 42 moves laterally toward the center belt 40 and the first outer belt 41. Once the narrow-product configuration is achieved, the first outer belt 41 overlaps a substantial portion of the first half 401 of the center belt 40 in the area of the belt pocket 26. The second outer belt 42 also overlaps a substantial portion of the second half 402 of the center belt 40 in the area of the belt pocket 26. The first and second outer belts 41, 42 generally remain spaced apart from one another during the move and while in the narrow-product configuration.

When the variable-width belt system 24 moves to the wide-product configuration, the first outer belt 41 moves laterally away from the center belt 40 and the second outer belt 42. At the same time, the second outer belt 42 moves laterally away from the center belt 40 and the first outer belt 41. Once the wide-product configuration is achieved, the first outer belt overlaps a relatively small portion of the first half 401 of the center belt in the area of the belt pocket 26. The second outer belt 42 also overlaps a relatively smaller portion of the second half 402 of the center belt 40 in the area of the belt pocket. The first and second outer belts 41, 42 generally remain spaced apart from one another during the move and while in the wide-product configuration.

Figure 7:
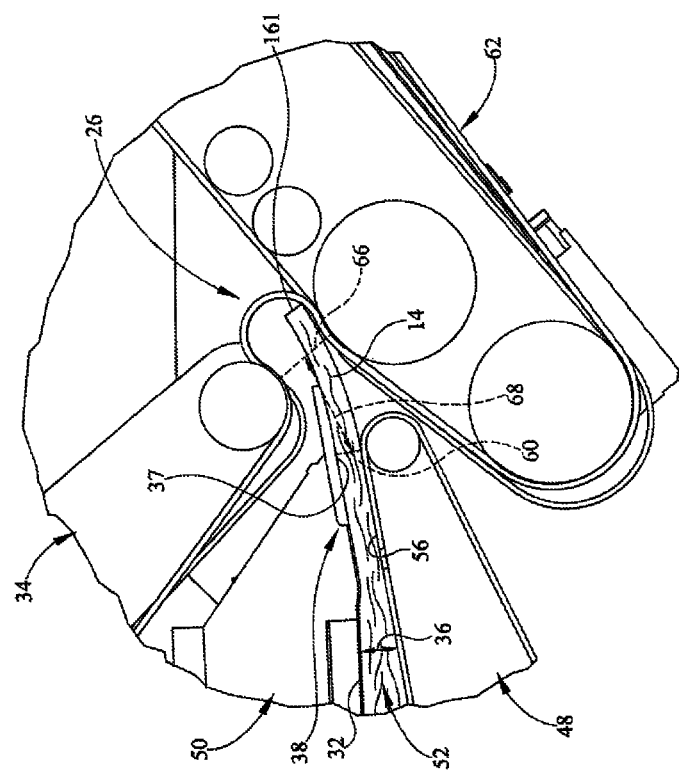
FIG. 7 is an enlarged partial view of FIG. 4 showing an entry distance defined between an exit of a pre-compression region formed between the pre-compression unit and the vacuum-conveyor system and a gap of the belt pocket formed between the pre-compression unit and the eject unit of the eject system when the packaging machine is in the initial stage of product winding.
Figure 8:
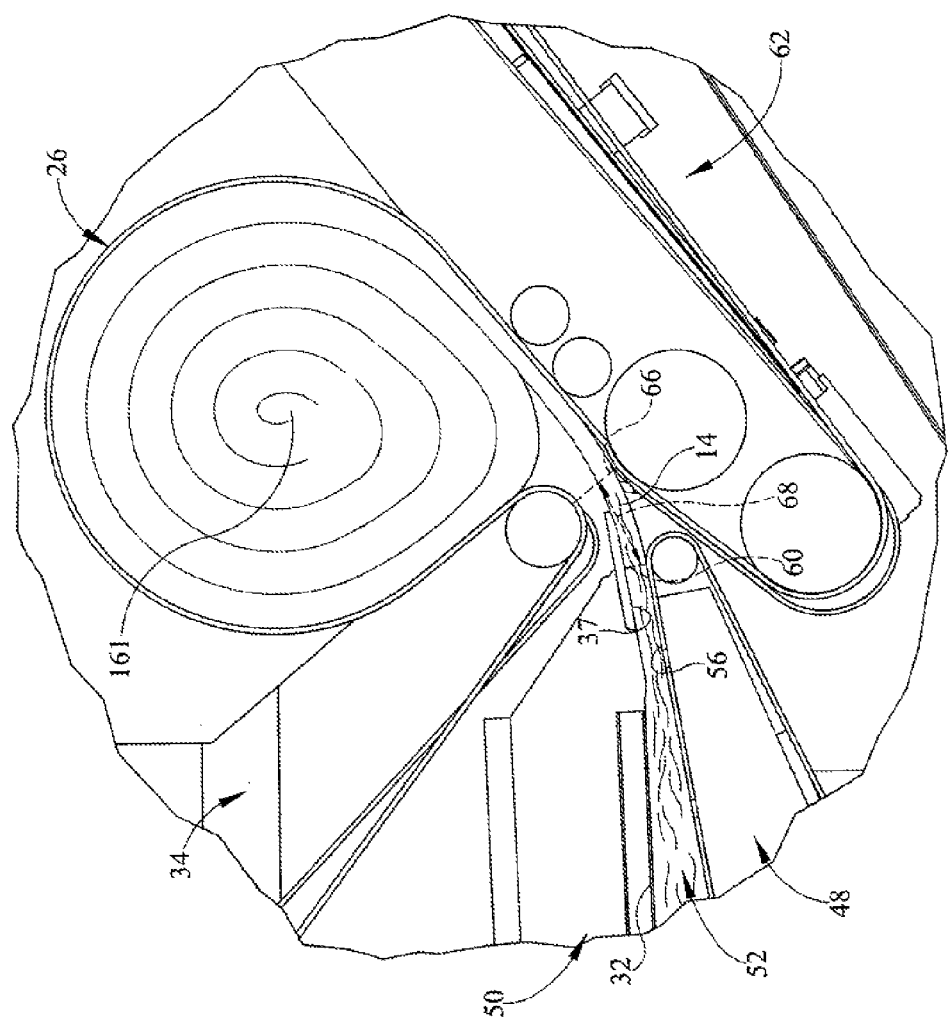
FIG. 8 is a view similar to FIG. 7 with the packaging machine in the final stage of product winding showing that the entry distance is relatively unchanged from the initial stage of product winding.

The packaging machine 10 further comprises a vacuum-conveyor system 48 and a pre-compression unit 50. The vacuum-conveyor system 48 is coupled to the machine foundation 22 in a fixed position relative to the machine foundation 22. The vacuum-conveyor system 48 is configured to provide product to the belt pocket 26 of the variable-width belt system 24. The pre-compression unit 50 is coupled to the machine foundation 22 in a fixed position during rolling of the product. The pre-compression unit 50 cooperates with the vacuum-conveyor system 48 to define a pre-compression region 52 therebetween as shown in FIGS. 7 and 8. The pre-compression unit 50 causes the uncompressed product 12 to be compressed so that air is removed and compression increases as the product moves through the pre-compression region 52 to the belt pocket 26.

Figure 6:
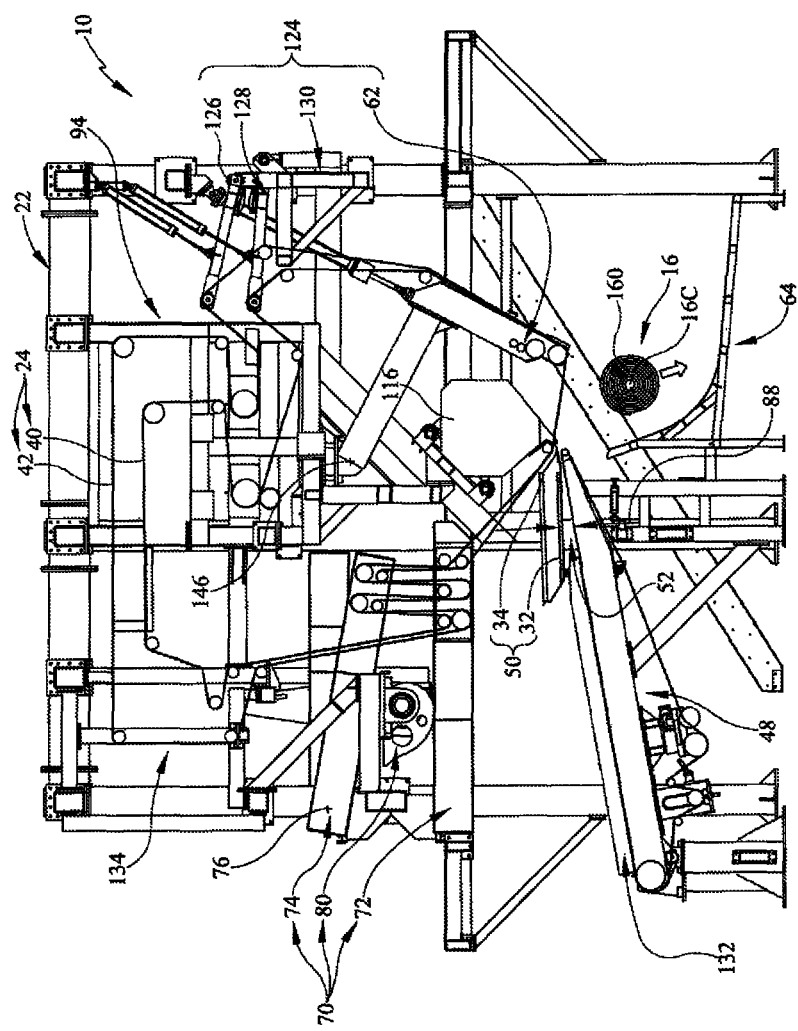
FIG. 6 is a view similar to FIG. 5 showing the packaging machine after the final stage has completed and the eject system is in the opened position causing the rolled product to be discharged from the belt system onto the receiving platform.

The pre-compression unit 50 includes a ramp 32 and a belt guide 34 as shown in FIGS. 4-6. The ramp 32 is coupled to the pre-compression region arm 84 and arranged to lie at an acute angle 36 measured between a downwardly facing surface 37 of the ramp 38 and an upwardly facing surface 56 of the vacuum-conveyor system 48 as shown in FIG. 7. The belt guide 34 is coupled to the ramp 32 to move therewith. The belt guide 34 is oriented so as to extend in a direction 58 away from the belt pocket 26. As shown in FIGS. 7 and 8, the ramp 32 and the belt guide 34 cooperate to define an exit 60 of the pre-compression region 52. Product that passes through the exit 60 of the pre-compression region 52 is called the pre-compressed product 14 before passing to the belt pocket 26.

Figure 2:
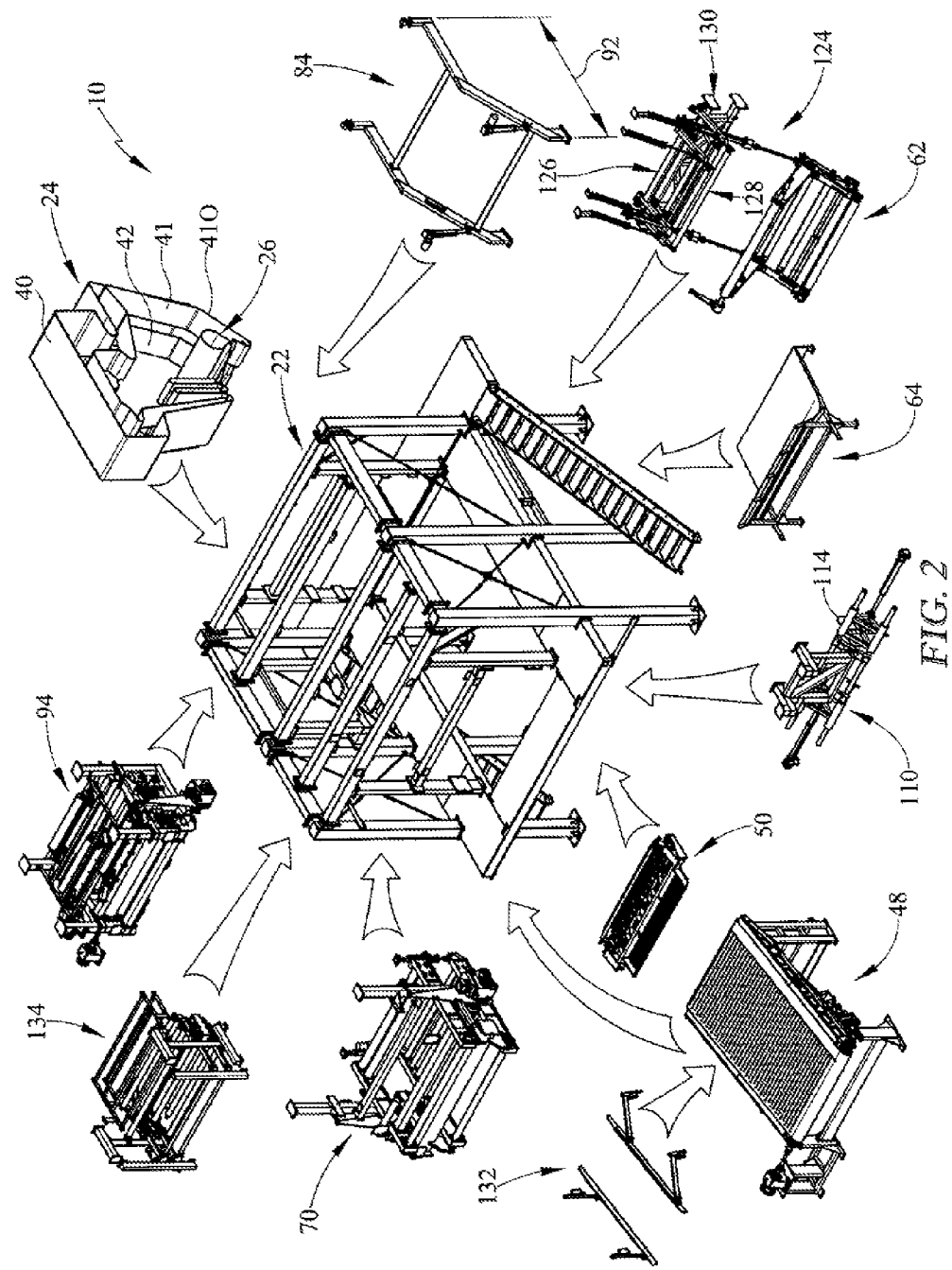
FIG. 2A is an exploded assembly view of the cam system of FIG. 2 showing that the cam system includes, starting at a lower-left of the page, a belt-feed unit, a cam unit, and a pocket-adjustment unit.
Figure 2A:
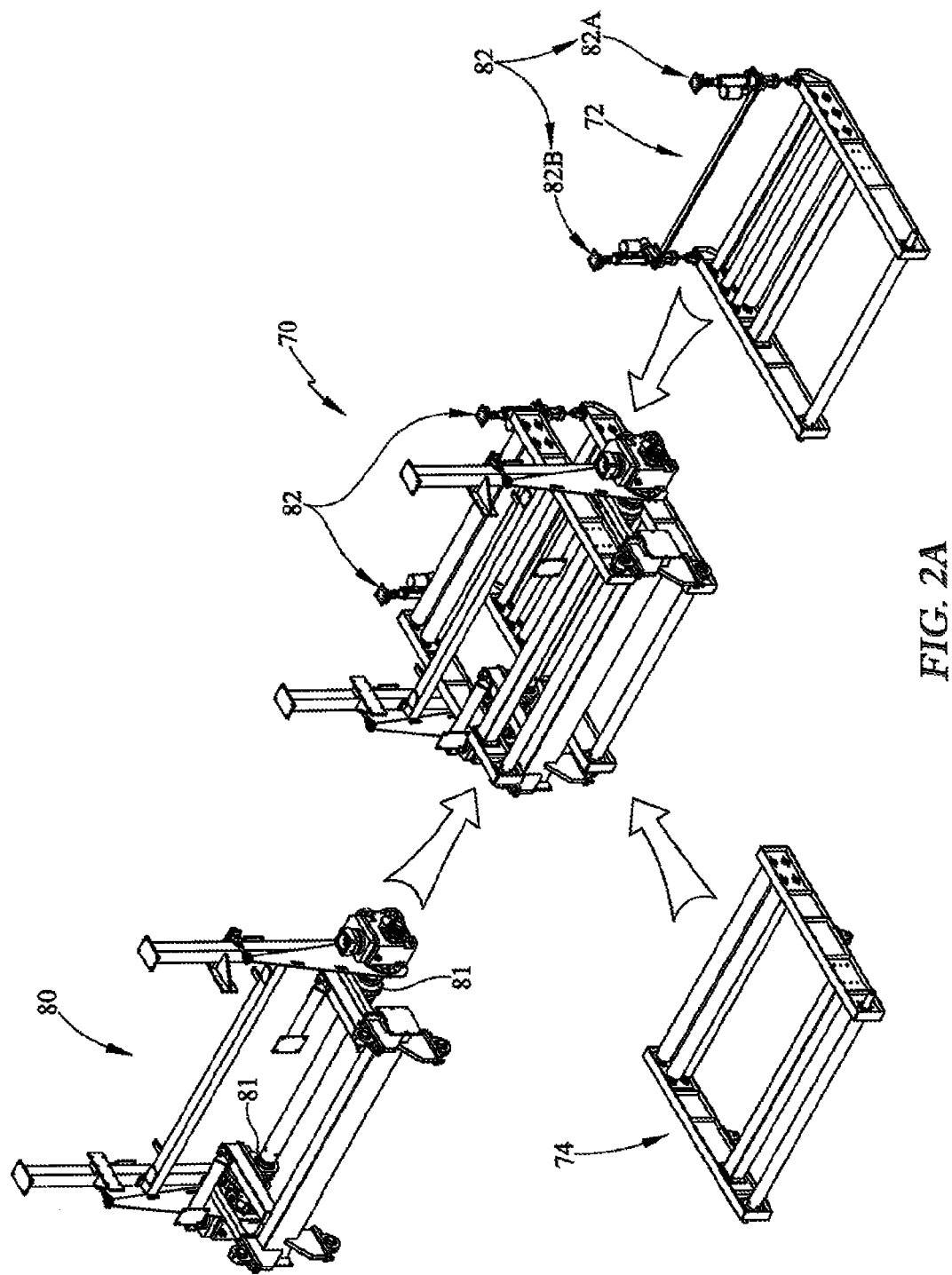

The packaging machine 10 further includes an eject unit 62 as shown in FIG. 2. The eject unit 62 is coupled to the machine foundation 22 to move between a closed position as shown in FIGS. 4 and 5 and an opened position shown in FIG. 6. The eject unit 62 in the closed position cooperates with the belt guide 34 of the pre-compression unit 50 to establish the belt pocket 26. The eject unit 62, when in the opened position, causes the belt pocket 26 to collapse and the rolled product 16 to be ejected from the packaging machine onto a rolled-product receiver 64 as suggested in FIG. 6.

As shown in FIGS. 7 and 8, the eject unit 62 and the belt guide 34 of the pre-compression unit 50 cooperate to define a gap 66 of the belt pocket 26. The pre-compressed product 14 passes through the gap 66 into the belt pocket 26 during rolling of the product. An entry distance 68 is defined between the exit 60 of the pre-compression region 52 and the gap 66 of the belt pocket 26. As pre-compressed product 14 begins being introduced in the belt pocket 26, the packaging machine is in an initial stage of rolling. As pre-compressed product 14 ceases being fed into the belt pocket, the packaging machine 10 is in a final stage of rolling. The entry distance 68 remains generally unchanged while the belt pocket 26 rolls product as suggested in FIGS. 7 and 8.

During rolling of the product, the belt pocket 26 increases in size as more pre-compressed product 14 is admitted into the belt pocket 26 as shown in FIGS. 4 and 5. The packaging machine 10 includes a cam system 70 that is configured to pay out and take in belt from the variable-width belt system 24 to vary the size of the belt pocket 26. The cam system 70 is coupled to the machine foundation 22 in a fixed position relative to the machine foundation 22. The variable-width belt system 24 is routed through the cam system 70 to cause the center-belt path 44, the first outer-belt path 45, and the second outer-belt path 46 to be varied so that the belt pocket 26 changes in size at a predetermined rate as pre-compressed product 14 is fed into the belt pocket 26.

The cam system 70 includes, for example, a pocket-adjustment unit 72 and a belt-feed unit 74 as shown in FIG. 2B. The pocket-adjustment unit 72 is coupled to the machine foundation 22 in a fixed position during rolling of the product. The belt-feed unit 74 is coupled to the machine foundation 22 to pivot up and down about a pivot axis 76 relative to the machine foundation 22 as shown in FIGS. 4-6. The variable-width belt system 24 is routed between the pocket-adjustment unit 72 and the belt-feed unit 74 to cause the belt pocket 26 to increase in size as the belt-feed unit 74 pivots in a clockwise direction 78 about the pivot axis 76 as shown in FIGS. 4 and 5.

As illustrated in FIG. 2B, the cam system 70 further includes a cam unit 80 positioned to lie between the pocket-adjustment unit 72 and the belt-feed unit 74. The belt-feed unit 74 pivots in response to rotation of the cam unit 80 relative to the pocket-adjustment unit 72. In one illustrative example, each degree of rotation of the pocket-adjustment unit 72 feeds about 6.3 inches (about 16 cm) of belt from the variable-width belt system 24 into the belt pocket 26 as a result of rotation of the cam unit 80.

The cam unit 80, the pocket-adjustment unit 72, and the belt-feed unit 74 cooperate to provide means for paying out belt from the variable width belt system 24 to the belt pocket 26 to increase a circumference of the belt pocket at a belt-payout rate while pre-compressed product 14 is admitted into the belt pocket at a product rate so that pressure developed in the rolled product 16 is controlled throughout rolling of the pre-compressed product 14. In one example, the belt-payout rate is generally constant and the product rate is generally contant during rolling of the pre-compressed product. As a result, a linear relationship may be established between the belt-payout rate and the product rate so a pressure profile may be established for any product as a result of varying the belt-payout rate and the product rate during rolling of the product.

In another example, a non-linear relationship may be established between the belt-payout rate and the product. Such non-linear relationship may be developed as a function of recovered thickness along a length of the unrolled product 122. In this instance, the unrolled product 122 may have a region in which the recovered thickness was undesirable. As a result, this information may be fed back to the packaging machine 10 and the non-linear relationship may be used to payout additional belt during rolling of the region in which the undesirable recovered thickness was observed.

In still yet another example, a non-linear relationship may be derived from the density of the pre-compressed product 14. The non-linear relationship may be used to control for variations in manufacturing of the pre-compressed product 14 to produce rolled product 16 that has desirable recovered thickness along the entire length of the unrolled product 122. Such measurements may be obtained during manufacturing or after manufacturing during quality control testing.

The cam system 70 further includes sensors 82 that are coupled to the pocket-adjustment unit 72 as shown in FIG. 2B. The sensors 82 are configured to sense tension in the variable-width belt system 24. As tension in the variable-width belt system 24 increases, pressure is developed in the rolled product 16. In one illustrative example, the sensors 82 include two load cells 82A, 82B that are configured to sense tension in the center belt 40, the first outer belt 41, and the second outer belt 42. In one example, the pressure of the rolled product 16 is generally constant throughout from a center 16C of the rolled product 16 to an outer surface 16O of the rolled product as shown in FIG. 6. In another example, the pressure may be non-constant from the center 16C to the outer surface 16O. The non-constant pressure may, in one example, decrease from the center 16C to the outer surface 16O.

The sensors 82 may be coupled to a controller that is configured to log forces exerted on the variable-width belt system 24. Those forces may be used to make correlations between changing density of the uncompressed product 12 as it is fed into the packaging machine 10. As a result, the sensors 82 may be used as part of a feedback loop to influence process changes in upstream processes to the packaging machine. In the example where the uncompressed product 12 is an insulation batt, the process of forming the insulation may be changed as a result of sensor data provided by the sensors 82. The sensor data may show increased force to roll the pre-compressed product 14 which indicates that density of the uncompressed product 12 is increasing. As a result, the operators may change the upstream process to return the density of the uncompressed product to a desired value.

As shown in FIG. 2, the packaging machine 10 includes a pre-compression region arm 84. The pre-compression region arm 84 is coupled to the machine foundation 22 to pivot back and forth about an arm axis 86 when the packaging machine 10 is not rolling product. The pre-compression unit 50 is coupled to the pre-compression region arm 84 to move therewith to vary a thickness 88 of the pre-compression region 52 so that various product configurations may be accepted and packaged with packaging machine 10. As the pre-compression region arm 84 rotates in a clockwise direction 90 about the arm axis 86, the thickness 88 of the pre-compression region 52 increases.

As illustrated in FIG. 2, the pre-compression region arm 84 has a length 92 that is configured to establish a generally linear movement of the pre-compression unit 50 during movement of the pre-compression region arm 84. As an example, the generally linear movement of the pre-compression unit is up and down.

The packaging machine 10 also includes a belt-drive system 94 as shown, for example, in FIG. 2. The belt-drive system 94 is coupled to the machine foundation 22 in a fixed position relative to the machine foundation 22. The belt-drive system 94 is configured to provide means for driving the variable-width belt system 24 to move relative to the machine foundation 22 so that the pre-compressed product 14 admitted into the belt pocket 26 is rolled to form the rolled product. The belt-drive system 94 is also configured to provide means for arranging the variable-width belt system 24 between the narrow-product configuration and wide-product configuration so that variable width products may be received and rolled up in the belt pocket 26.

The belt-drive system 94 includes, for example, a center belt-adjustment unit 96, a first outer-belt adjustment unit 98, and a second outer-belt adjustment unit 100 as shown in FIG. 10B. The center belt-adjustment unit 96 is configured to support and move the center belt 40 relative to the machine foundation 22 to cause the center-belt path 44 to remain generally fixed relative to the machine foundation. The first outer-belt adjustment unit 98 is configured to support and move the first outer belt 41 relative to the machine foundation 22 to cause the first outer-belt path 45 to move back and forth laterally relative to the machine foundation 22. The second outer-belt adjustment unit 100 is configured to support and move the second outer belt 42 relative to the machine foundation 22 to cause the second outer-belt path 46 to move back and forth laterally relative to the machine foundation 22.

As shown in FIG. 10B, each belt-adjustment unit 96, 98, 100 includes a first pivot frame 101, a second pivot frame 102, a roller 104, an actuator 106, and a sensor 108. The roller 104 is configured to support the associated belt and is coupled on a first end to the first pivot frame 101 which is moved by the actuator 306. The roller 104 is coupled on an opposite second end to the second pivot frame 102. Each end of the roller 102 is permitted to pivot relative to each pivot frame 101, 102. In an example of use, the actuator 106 moves the first and second pivot frames 101, 102 causing the roller 104 to cant at an angle relative to the belt. As a result, the belt moves along the roller 104. The sensor 108 is coupled to move relative to the machine foundation 22. In an example of use, the sensor 108 is coupled to a controller which coordinates movement of the actuator 106 which in turn causes the pivot frames 101, 102 to move. When the sensor 108 moves, the controller commands the actuator 106 to cause the roller 102 and associated belt to move to so that the edge of the belt is sensed.

In an example, the belt-adjustment units 96, 98, 100 are FIFE® belt guide systems of the Kamberoller type available from MAXCESS® of Oklahoma City, Okla. The FIFE® belt guide system includes an ultrasonic sensor configured to detect an edge of an associated belt, a roller that can steer the belt, a pair of actuators to shift the roll, and electrical controls. In a specific example, the center belt-adjustment unit 96 has the sensor 108 positioned in a fixed position so as to keep the center belt 40 centered on a centerline of the packaging machine 10 at all times during operation. The guide systems for the outer belts have the edge sensors on a FIFE® positioner. The positioner is an electronic linear servo controlled actuator. When the edge sensor is moved, the belt guide system steers the belt in response to the new location of the edge sensor.

The packaging machine 10 further includes an end-plate system 110 as shown in FIG. 2. The end-plate system 110 is configured to provide means for blocking lateral movement of the product in the belt pocket 26 during rolling of the product when the variable-width belt system 24 is in one of the narrow-product configuration and the wide-product configuration so that telescoping of the product is minimized.

The end-plate system 110 includes a support structure 112, a first end plate 114, and a second end plate 116. The support structure 112 is coupled to the machine foundation 22 in a fixed position. The first end plate 114 is coupled to the support structure 112 to move laterally relative to the support structure 112 to cause the first end plate to lie in spaced-apart relation to an outer edge 41O of the first outer belt 41 a first distance 118. The second end plate 116 is coupled to the support structure 112 to move laterally relative to the support structure 112 to cause the second end plate 116 to lie in spaced-apart relation to an outer edge 42O of the second outer belt 42 by a first distance 118. In one example, the first distance 118 is about 0.5 inches (about 1.3 cm).

The packaging machine 10 receives uncompressed product 12 therein and ejects the rolled product 16 out of the packaging machine 10 when rolling is complete. In one example, the rolled product 16 is an R-13 roll for retail market having a finished roll diameter of about 14.5 inches (about 37 cm). The R-13 roll has an uncompressed thickness of about 5.8 inches (about 14.5 cm) and a recovered thickness of about 3.5 inches (about 9 cm). The R-13 roll has an unrolled length of about 32.5 feet (about 9.9 in).

In another example, the rolled product 16 is an R6 flexible duct media having a finished roll diameter of about 24 inches (about 61 cm). The flexible duet media has an uncompressed thickness of about 3.8 inches (9.7 cm) and a recovered thickness of about 2.5 inches (about 6.4 cm). The rolled product has an unrolled length of about 225 feet to 250 feet (about 68.6 m to 76.2 m).

In still yet another example, the roiled product 16 is an R-30 metal building insulation roll having a finished roll diameter of about 24 inches (about 61 cm). The metal building insulation roll has an uncompressed thickness of about 14.0 inches (about 35.6 cm) and a recovered thickness of about 10.3 inches (about 26.2 cm). The metal building insulation roll has an unrolled length of about 34 to 38 feet (about 10.4 m to 11.6 m).

The rolled product 16 has a compression ratio of about 6.8 to 9.0. The compression ratio is calculated by dividing the post-compression bulk density of the product by the pre-compression bulk density. In one example, the rolled product 16 has a density of about 6.5 lb/ft$^3$ to 7.0 lb/ft$^3$ (about 104.5 kg/m$^3$ to 112.1 kg/m$^3$).

The rolled product 16 has a first end 161 arranged to lie at a center 16C of the rolled product 16 and an opposite second end 162 arranged to lie a circumference of the rolled product 16. The first end 161 has a recovered thickness 120 when the rolled product 16 is unrolled to form an unrolled product 122. The second end 162 has the recovered thickness 120 when the rolled product 16 is unrolled to form the unrolled product 122. Prior to rolling of uncompressed product 12, the uncompressed product 12 has a relatively greater uncompressed thickness 164 at both the first and the second ends 161, 162 as shown in FIG. 12A

As shown, for example, in FIG. 2, the packaging machine 10 includes the machine foundation 22, the belt-drive system 94, the pre-compression region arm 84, an eject system 124 including a center-belt bend-roll unit 126, an outer-belt bend-roll unit 128, an bend-roll support 130, and the eject unit 62, the end-plate system 110, the pre-compression unit 50, the vacuum-conveyor system 48, aside-guide system 132, the cam system 70 including the pocket-adjustment unit 72, the cam unit 80, and the belt-feed unit 74, and a trim system 134. The packaging machine 10 further includes a control system 136 configured to control the interaction of the various systems and units included in the packaging machine 10 as shown in FIG. 11.

The belt-drive system 94 provides drive power and speed control for the variable-width belt system 24. The three belts 40, 41, 42 of the variable-width belt system 24 are also tracked in the belt-drive system with associated belt-adjustment units 96, 98, 100.

The pre-compression region arm 84 sets the position and angle of the pre-compression unit 50 based on the product being rolled. The pre-compression region arm 84 allows for the position of the pre-compression unit 50, the angle of the pre-compression unit 50 relative to the vacuum-conveyor system 48, and the thickness 88 of the pre-compression region 52 to be varied in a recipe for each product being rolled by the packaging machine 10.

The eject system 124 includes the center-belt bend-roll unit 126, the outer-belt bend-roll unit 128, the bend-roll support 130, and the eject unit 62. The eject system 124 coordinates take up of excess belt in the variable-width belt system 24 when the eject unit 62 moves from the closed position with the rolled product 16 in the belt pocket 26 to the opened position with the belt pocket 26 collapsed and the rolled product 16 ejected form the packaging machine 10.

As the eject unit 62 moves from closed position to the opened position, the eject unit 62 swings open to allow the finished rolled product 16 to fall away from the packaging machine 10. The eject unit 62 pivots about an eject axis 146 in a counter-clockwise direction 148 in response to application of a pivot force provided by a servo motor through a gear reduction unit with assistance from two pneumatic cylinders. The amount of angular displacement the eject unit 62 moves through when going from the closed position to the opened position is controlled by the servo motor rotation and is a value included in the product recipe. Because the angular displacement is controlled for each product, cycle time of the packaging machine may be minimized.

The end-plate system 110 provides containment pressure on the ends of the rolled product 16. As a result, telescoping of the rolled product 16 is minimized as the product is rolled tightly.

The vacuum-conveyor system 48 is the area where the uncompressed product 12 is fed into the packaging machine 10. The vacuum-conveyor system 48 uses negative pressure from a fan to hold the uncompressed product 12 true as it is rolled into the belt pocket 26. The fan suction is additionally used to exhaust entrained air from uncompressed product 12 as it passes through the pre-compression region 52. The vacuum-conveyor system 48 grips the uncompressed product 12 with sufficient force to drive it under through the pre-compression region 52 to expel air from the uncompressed product 12 and produce the pre-compressed product 14.

The side-guide system 132 is coupled to the vacuum-conveyor system 48 and is configured to center the product as moves along the vacuum-conveyor system 48. The side-guide system moves between a narrow-guide configuration shown in FIG. 9 and a wide-guide configuration shown in FIG. 10.

The cam system 70 includes the belt-feed unit 74, the pocket-adjustment unit 72, and the cam unit 80 as shown in FIGS. 2 and 2B. The cam system 70 provides precise, position based control for the belt-feed unit 74 based on the recipe for each rolled product 16 desired. Servo motors included in the cam unit 80 rotate cam shafts to cause the belt-feed unit 74 to rotate in the clockwise direction 78 and pay belt from the variable-width belt system 24 into the belt pocket 26 as a diameter of the rolled product 16 increases.

The initial size of the belt pocket 26 is determined when a cam 81 included in the cam unit 80 is arranged in a home position at zero degrees of rotation. When the cam is in the home position, the pocket-adjustment unit 72 may adjusted so that the initial size of the belt pocket has a diameter of about 12 inches (about 30.5 cm). The starting position of the cam 81 included in the cam unit may be adjusted according to the selected product recipe so that the initial size of the belt pocket 26 may be varied according to the product to be rolled in the belt pocket.

The belt-feed unit 74 cooperates with the cam unit 80 to accumulate and pay out belt from the variable-width belt system 24 into the belt pocket 26 during rolling to control the diameter of the finished rolled product 16. The belt-feed unit 74 further includes sensors 82 that sense belt tension and provide feedback for over-tension protection of the packaging machine 10.

The three belts 40, 41, 42 may be installed with a vulcanizing process on the packaging machine 10 so that only rough belt-length control is provided. The initial belt pocket of the two outer belts 41, 42 should be the same and they should be adjustable to match the initial belt pocket of the center belt 40. The trim system 134 provides fine tuning of the two outer belts 41, 42 relative to the center belt 40 to generate an initial belt pocket 26 that is consistent between the three belts 40, 41, 42. Also, as the three overlapping belts 40, 41, 42 stretch at different rates over time, the trim system 134 allows for manual operator adjustment to keep the belt pocket size consistent for the three belts 40, 41, 42.

The control system 136 of the packaging machine 10 includes a controller 138 and a user interface 140. The controller 138 includes a processor 142, memory 144, numerous inputs 150, and numerous outputs 152 as shown in FIG. 11. The user interface 140 is configured to receive user inputs and provide status information to an operator. The numerous inputs 150 may be coupled to sensors 154. In one example, sensors 154 are the sensors 82 included in cam system 70. In another example, the numerous outputs 150 may be coupled to motors 156 and actuators 158 included in the packaging machine 10. In one example, the user inputs may include a selector to instruct the controller 138 to assume either an automatic mode or a manual mode and a toggle button to enable/disable a maintenance mode that is available when in the manual mode. The user inputs may also include start and stop buttons to control movement of the center belt 40 and the outer belts 41, 42.

When the automatic mode is engaged, the user inputs may also include cycle start and stop buttons to enable/disable an automatic rolling process, an all open toggle button to activate/deactivate an all open process, and a compression clean out button to perform a clean-out process for the pre-compression unit 50. The user inputs may also include login/logout security controls as well as manual controls for servos, variable frequency drives, and motor starters. This may include jog selection buttons to enable two physical or virtual (+ and −) buttons to jog a specific motor as well as start and stop controls to run a specific drive or motor starter.

The user inputs also may include product recipe controls. These recipe controls may give the ability to create new product recipes with data entered by the operator or uploaded from the memory 144 of the controller 138. The recipe controls may also provide for viewing, editing, deleting, and downloading product recipes. The user inputs may also include a physical or virtual button to reset faults in the control system 136.

The user interface 140 is also configured to display status information. The status information may include current line speed in feet per minute (or in meters per minute), current roll-up speed in feet per minute (or in meters per minute), the current diameter of the rolled product 16 in inches (or in centimeters), the belt tension on the left and right side in pounds (or in kilograms), the motor information for the servos that includes position, velocity, and status information such as enabled, referenced, or faulted, motor information from the variable frequency drives such as velocity actual and set point and status information such as enabled and faulted, motor information for motor starters such as status information that includes whether the motors are running, stopped, faulted, or disconnect closed, recipe information including name, revision, revision date, revision by, and description fields for documentation of changes, active system alarms, and stored alarm history.

The product recipe may include various inputs. In one example, those inputs include product length to be included in the rolled product 16, product width, final circumference of the rolled product 16, belt pocket 26 size, and speed of variable-width belt system 24, amount of pre-compressed product 14 in the belt pocket 26 before the cam system 70 begins paying out belt into the belt pocket 26, vertical position of the pre-compression unit 50, pre-compression unit clean-out cycle time and count, opened position of the eject unit 62, and eject unit open delay in linear feet (or in linear meters).

In an example process of use, the controller 138 instructs the cam system 70 to be at a start position in which the belt-feed unit 74 is at a raised position relative to the pocket-adjustment unit 72. The controller 138 also instructs the eject unit 62 to be in the closed position, the belt-drive system 94 to drive the variable-width belt system 24 at roll-up speed, and the vacuum-conveyor system 48 to operate at roll-up speed. A first photoeye sensor senses a leading edge of the uncompressed product 12 and checks to make sure a second photoeye sensor senses the leading edge within a predetermined distance. The predetermined distance in one example is about 14 feet (about 43 m).

The second photoeye sensor senses the leading edge of the uncompressed product 12 and the processor 142 starts totaling the linear feet of material (or in linear meters of material) fed into the rolled product 16. A recipe setpoint will determine the amount of feet of material (or in meters of material) allowed into the belt pocket 26 before starting the cam unit 80. Belt payout is controlled via the servo motors included in cam unit 80. The rate of payout is determined by pack length, initial pocket size, final circumference, and wind-up speed from the product recipe. The belt feed servo motors should run at a generally constant speed.

During the roll-up cycle, sensors 82 monitor belt tension. If the belt payout overload warning is tripped, then controller 138 commands an alarm to sound and may increase the belt payout to reduce tension in the belt pocket 26. If the belt payout overload fault is tripped, then the system will alarm and the eject unit 62 will move to the opened position, and the belt drives will stop in the belt-drive system 94. An operator will reset the packaging machine after such a fault is detected.

In the event an operator commands an all-open process using the user interface 140, the controller 138 commands the eject unit 62 to move to the opened position, the cam unit 80 to move to the start position, and the pre-compression unit 50 to move to a full up position in which the pre-compression unit 50 is spaced apart from the vacuum-conveyor system 48 a maximum distance. In addition, the controller 138 also commands the first and second end plates 114, 116 of the end-plate system 110 to move laterally away from the variable-width belt system 24 about 2 inches (about 5.1 cm) on each side, if the eject unit 62 is moving to the opened position, the controller 138 also commands actuators included in the eject system 124 to retract raising the center-belt bend-roll unit 126 and the outer-belt bend-roll unit 128. The eject unit 62 may then start to move slowly to the closed position while the cam unit is returning to the start position. The actuators included in the eject system 124 also elongate when the eject unit 62 is about in the closed position.

As the packaging machine 10 approaches the final stave of rolling, the first photoeye sensor senses the trailing edge of the uncompressed product 12. After about fifteen feet (about 4.6 m) beyond the end of the roll, a poly-wrap system commences and a poly feed decline conveyor indexes an overwrap into the belt pocket 26. The rolled product 16 will make one additional rotation plus an eject delay distance with the overwrap in place before the eject unit 62 moves to the opened position. The eject delay distance places the seam of the overwrap so that it is not on the bottom of the rolled product 16. The closed position is defined by the product recipe so that the eject unit only has to move a sufficient distance to accommodate the diameter of the rolled product 16.

In an example of moving the variable-width belt system 24 from the narrow-product configuration to the wide-product configuration, the controller 138 first commands the end plates 114, 116 of the end-plate system 110 to move to their widest setting. The controller 138 commands the belt-adjustment units 96, 98, 100 of the belt-drive system 94 to move the variable-width belt system 24 to the wide-product arrangement which may be an input in the product recipe. Next, the controller 138 commands the end plates 114, 116 to move laterally inward into position adjacent the outer edges 41O, 42O of the outer belts 41, 42. In an example, a width of the variable-width belt system 24 may adjusted in four inch increments.

In the event one of the belt-adjustment units 96, 98, 100 fails to signal to the controller 138 that it has reached the desired location within a set time, the controller issues a fault. The controller then commands the belt-drive system 94 to stop the variable-width belt system 24. An operator should manually reset the system to re-start the process of adjusting the variable-width belt system 24.

The packaging machine may be used to roll and package mineral wool insulation, for example, glass wool insulation or stone wool insulation. Such mineral wool insulation prior to rolling and packaging and/or when unwrapped from rolled packaging may have a density which is ≥ about 0.3 lb/ft$^3$ (about 5 kg/m$^3$) or ≥ about 0.6 lb/ft$^3$ (about 10 kg/m$^3$) and/or a density which is ≤ about 5 lb/ft$^3$ (about 80 kg/m$^3$) or ≤ about 3 lb/ft$^3$ (about 50 kg/m$^3$).

The invention claimed is:

1. A packaging machine comprising
a machine foundation and
a variable-width belt system coupled to the machine foundation to move relative to the machine foundation to form a belt pocket adapted to receive a product therein to roll the product to establish a rolled product, the variable-width belt system being arranged in one of a narrow-product configuration in which the variable-width belt system has a narrow width and a wide-product configuration in which the variable-width belt system has a relatively greater width,
wherein the variable-width belt system includes a center belt coupled to the machine foundation to move about a center-belt path that is generally fixed relative to the machine foundation, a first outer belt coupled to the machine foundation to move about a first outer-belt path that is movable back and forth laterally relative to the center belt while overlapping a first portion of the center belt, and a second outer belt coupled to the machine foundation to move about a second outer-belt path that is movable back and forth laterally relative to the center belt while overlapping a second portion of the center belt.

2. The packaging machine of claim 1, wherein the first outer belt moves laterally toward the center belt and the second outer belt and the second outer belt moves laterally toward the center belt and the first outer belt without the first outer belt overlapping the second outer belt to cause the narrow-product configuration of the variable-width belt system to be established.

3. The packaging machine of claim 2, wherein the first outer belt moves laterally away from the center belt and the second outer belt and the second outer belt moves laterally away from the center belt and the first outer belt while both the first and second outer belts to cause the wide-product configuration of the variable-width belt system to be established.

4. The packaging machine of claim 1, further comprising a conveyor system coupled to the machine foundation in a fixed position relative to the machine foundation to provide the product to the belt pocket and a pre-compression unit coupled to the machine foundation to define a pre-compression region therebetween in which compression of the product increases as the product travels through the pre-compression region to the belt pocket.

5. The packaging machine of claim 4, wherein the pre-compression unit is coupled to the machine foundation in a fixed position relative to the conveyor system during rolling of the product to form the rolled product.

6. The packaging machine of claim 5, wherein the pre-compression unit includes a ramp arranged to lie at an acute angle measured between a downwardly facing surface of the ramp and an upwardly facing surface of the conveyor system and a belt guide coupled to the ramp to extend in a direction away from the belt pocket and the belt guide and the conveyor system cooperate to define an exit of the pre-compression region.

7. The packaging machine of claim 6, further including an eject unit coupled to the machine foundation to move between a closed position in which the belt pocket is established and an opened position in which the belt pocket is collapsed causing the rolled product to eject from the packaging machine.

8. The packaging machine of claim 7, wherein the eject unit and the belt guide cooperate to define a gap of the belt pocket through which product passes before the belt pocket begins to roll the product, an entry distance is defined between the exit of the pre-compression region and the gap of the belt pocket, and the entry distance remains generally unchanged while the belt pocket rolls the product.

9. The packaging machine of claim 1, further comprising a cam system coupled to the machine foundation in a fixed position, the variable-width belt system is routed through the cam system to cause the center-belt path, the first outer-belt path, and the second outer-belt path to be varied to cause the belt pocket to increase in size at a predetermined rate as product is fed into the belt pocket.

10. The packaging machine of claim 9, wherein the cam system includes a pocket-adjustment unit coupled to the machine foundation in a fixed position during rolling of the product and a belt-feed unit coupled to the machine foundation to pivot up and down about a pivot axis relative to the machine foundation, the variable-width belt system is routed between the pocket-adjustment unit and the belt-feed unit to cause the belt pocket to increase in size as the belt-feed unit pivots in a clockwise direction about the pivot axis.

11. The packaging machine of claim 10, wherein the cam system further includes a cam positioned to lie between the pocket-adjustment unit and the belt-feed unit and the belt-feed unit pivots in response to rotation of the cam relative to the pocket-adjustment unit.

12. The packaging machine of claim 10, wherein the cam system further includes sensors coupled to the pocket-adjustment unit and configured to sense tension in the variable-width belt system to cause a tightness profile to be developed in the rolled product.

13. The packaging machine of claim 12, wherein the sensors are two load cells configured to sense tension in the center belt, the first outer belt, and the second outer belt.

14. The packaging machine of claim 12, wherein the tightness profile is generally constant throughout.

15. The packaging machine of claim 12, wherein the tightness profile changes from a center of the rolled product to an outer surface of the rolled product.

16. The packaging machine of claim 1, further comprising a conveyor system coupled to the machine foundation in a fixed position relative to the machine foundation to provide the product to the belt pocket, a pre-compression region arm coupled to the machine foundation to pivot back and forth about an arm axis when the packaging machine is not rolling product, and a pre-compression unit coupled to the pre-compression region arm to move therewith to vary a thickness of a pre-compression region defined between the pre-compression unit and the conveyor system.

17. The packaging machine of claim 16, wherein the pre-compression region arm rotates in a clockwise direction about the arm axis to increase the thickness of the pre-compression region.

18. The packaging machine of claim 17, wherein the pre-compression region arm has a length configured to establish a generally linear movement of the pre-compression unit during movement of the pre-compression region arm.

19. The packaging machine of claim 1, further comprising a belt-drive system coupled to the machine foundation in a fixed position relative to the machine foundation, the belt-drive system being configured to provide means for driving the variable-width belt system to move relative to the machine foundation so that product admitted into the belt pocket is rolled to form the rolled product and for arranging the variable-width belt system between the narrow-product configuration and the wide-product configuration so that variable width products may be received in the belt pocket.

20. The packaging machine of claim 19, wherein the belt-drive system includes a center belt-adjustment unit configured to support and move the center belt relative to the machine foundation to cause the center-belt path to remain generally fixed relative to the machine foundation, a first outer-belt adjustment unit configured to support and move the first outer belt relative to the machine foundation to cause the first outer-belt path to move back and forth laterally relative to the machine foundation, and a second outer-belt adjustment unit configured to support and move the second outer belt relative to the machine foundation to cause the second outer-belt path to move back and forth laterally relative to the machine foundation.

21. The packaging machine of claim 19, further comprising an end-plate system configured to provide means for blocking lateral movement of the product in the belt pocket during rolling of the product when the variable-width belt system is in one of the narrow-product configuration and the wide-product configuration so that telescoping of the product is minimized.

22. The packaging machine of claim 21, wherein the end-plate system includes a support structure, a first end plate coupled to the support structure to move laterally relative to the support structure to cause the first end plate to lie in spaced-apart relation to an outer edge of the first outer belt a first distance, a second end plate coupled to the support structure to move laterally relative to the support structure to cause the second end plate to lie in spaced-apart relation to an outer edge of the second outer belt the first distance.

23. The packaging machine of claim 22, wherein the first distance is about 0.5 inches (about 1.3 cm).

24. The packaging machine of claim 1, wherein the rolled product has an un-rolled length of about 33 feet (about 10.1 m) with a recovered thickness of about 13 inches (about 33 cm).

25. The packaging machine of claim 1, wherein the rolled product has an un-rolled length of about 225 feet (about 68.6 m) with a recovered thickness of about 4 inches (about 10.2 cm).

26. The packaging machine of claim 25, wherein the rolled product has a compression ratio of about 6.8 to 9.0.

27. The packaging machine of claim 25, wherein the rolled product has a density of about 6.5 lb/ft$^3$ to 7.0 lb/ft$^3$ (about 104.5 kg/m$^3$ to 112.1 kg/m$^3$).

28. The packaging machine of claim 1, wherein the rolled product has a first end arranged to lie at a center of the rolled product and an opposite second end arranged to lie at a circumference of the rolled product, the first end has an unrolled thickness when the rolled product is unrolled to form an unrolled product and the opposite second end has the unrolled thickness when the rolled product is unrolled to form the unrolled product.

29. The packaging machine of claim 1 further comprising means for paying out belt from the variable-width belt system to the belt pocket to increase a circumference of the belt pocket at a belt-payout rate while the product is admitted to the belt pocket at a product rate to cause a linear relationship to be established between the belt-payout rate and the product rate so that pressure developed in the rolled product is controlled during rolling of the product.

30. The packaging machine of claim 29, wherein the means for paying belt includes a pocket-adjustment unit coupled to the machine foundation in a fixed position during rolling of the product, a belt-feed unit coupled to the machine foundation to pivot up and down about a pivot axis relative to the machine foundation, and a cam positioned to lie between the pocket-adjustment unit and the belt-feed unit to cause the belt-feed unit to pivot in a clockwise direction about the pivot axis to cause the belt pocket to increase in size as the cam rotates relative to the pocket-adjustment unit.

* * * * *